United States Patent
Markovic et al.

(10) Patent No.: US 9,727,511 B2
(45) Date of Patent: Aug. 8, 2017

(54) INPUT/OUTPUT MODULE WITH MULTI-CHANNEL SWITCHING CAPABILITY

(71) Applicant: Bedrock Automation Platforms Inc., San Jose, CA (US)

(72) Inventors: Craig Markovic, Vancouver (CA); Albert Rooyakkers, Sunnyvale, CA (US); James G. Calvin, Attleboro, MA (US)

(73) Assignee: Bedrock Automation Platforms Inc., San Jose, CA (US)

( * ) Notice: Subject to any disclaimer, the term of this patent is extended or adjusted under 35 U.S.C. 154(b) by 254 days.

(21) Appl. No.: 14/618,292

(22) Filed: Feb. 10, 2015

(65) Prior Publication Data

US 2015/0154136 A1  Jun. 4, 2015

Related U.S. Application Data

(63) Continuation-in-part of application No. PCT/US2013/053721, filed on Aug. 6, 2013, and a
(Continued)

(51) Int. Cl.
*G06F 13/00* (2006.01)
*G06F 13/40* (2006.01)
(Continued)

(52) U.S. Cl.
CPC .......... *G06F 13/4022* (2013.01); *G06F 21/44* (2013.01); *H04L 9/083* (2013.01);
(Continued)

(58) Field of Classification Search
None
See application file for complete search history.

(56) References Cited

U.S. PATENT DOCUMENTS 4,082,984 A    4/1978 Iwata
4,628,308 A   12/1986 Robert
(Continued)

FOREIGN PATENT DOCUMENTS

CN    102480352    5/2012
EP     2317743     5/2011
(Continued)

OTHER PUBLICATIONS

Office Action dated Oct. 19, 2016 for Canadian Appln. No. 2,920,133.
(Continued)

*Primary Examiner* — Henry Tsai
*Assistant Examiner* — Aurangzeb Hassan
(74) *Attorney, Agent, or Firm* — Advent, LLP

(57) ABSTRACT

The present disclosure is directed to an input/output module. In some embodiments, the input/output module includes: a plurality of communication channels, each channel of the plurality of communication channels configured to connect to one or more field devices; switch fabric configured to selectively facilitate connectivity between an external control module and the one or more field devices via the plurality of communication channels; a serial communications port configured for connecting the input/output module to the control module in parallel with a second input/output module, the serial communications port configured for transmitting information between the input/output module and the control module; and a parallel communications port configured for separately connecting the input/output module to the control module, the parallel communications port configured for transmitting information between the input/output module and the control module, and transmitting information between the input/output module and the second input/output module.

21 Claims, 15 Drawing Sheets

Related U.S. Application Data continuation-in-part of application No. 14/469,931, filed on Aug. 27, 2014, now Pat. No. 9,191,203, and a continuation-in-part of application No. 14/446,412, filed on Jul. 30, 2014, application No. 14/618,292, filed on Feb. 10, 2015, which is a continuation-in-part of application No. 14/519,066, filed on Oct. 20, 2014, and a continuation-in-part of application No. 14/519,047, filed on Oct. 20, 2014, now Pat. No. 9,467,297, and a continuation-in-part of application No. 14/597,498, filed on Jan. 15, 2015, which is a continuation of application No. 13/341,143, filed on Dec. 30, 2011, now Pat. No. 8,971,072, application No. 14/618,292, filed on Feb. 10, 2015, which is a continuation-in-part of application No. PCT/US2012/072056, filed on Dec. 28, 2012, and a continuation-in-part of application No. 14/501,974, filed on Sep. 30, 2014, now Pat. No. 9,436,641, which is a continuation of application No. 13/341,161, filed on Dec. 30, 2011, now Pat. No. 8,862,802, application No. 14/618,292, filed on Feb. 10, 2015, which is a continuation-in-part of application No. 14/502,006, filed on Sep. 30, 2014, now Pat. No. 9,465,762, which is a continuation of application No. 13/341,176, filed on Dec. 30, 2011, now Pat. No. 8,868,813.

(60) Provisional application No. 62/114,030, filed on Feb. 9, 2015, provisional application No. 62/021,438, filed on Jul. 7, 2014.

(51) Int. Cl.
*H04L 9/08* (2006.01)
*H04L 9/32* (2006.01)
*G06F 21/44* (2013.01)
*H04L 29/06* (2006.01)
*H04L 12/64* (2006.01)
*G06F 13/38* (2006.01)
*H04L 29/08* (2006.01)

(52) U.S. Cl.
CPC .......... *H04L 9/3228* (2013.01); *H04L 9/3263* (2013.01); *H04L 12/6418* (2013.01); *H04L 63/062* (2013.01); *H04L 63/08* (2013.01); *G06F 13/385* (2013.01); *G06F 13/409* (2013.01); *G06F 13/4027* (2013.01); *G06F 13/4072* (2013.01); *G06F 13/4086* (2013.01); *H04L 67/12* (2013.01)

(56) References Cited

U.S. PATENT DOCUMENTS

| | | |
|---|---|---|
| 4,656,622 A | 4/1987 | Lea |
| 4,691,384 A | 9/1987 | Jobe |
| 4,882,702 A | 11/1989 | Struger et al. |
| 4,929,939 A | 5/1990 | Varma et al. |
| 5,229,652 A | 7/1993 | Hough |
| 5,469,334 A | 11/1995 | Balakrishnan |
| 5,590,284 A | 12/1996 | Crosetto |
| 5,602,754 A | 2/1997 | Beatty et al. |
| 5,719,483 A | 2/1998 | Abbott et al. |
| 5,951,666 A | 9/1999 | Ilting et al. |
| 5,958,030 A | 9/1999 | Kwa |
| 6,009,410 A | 12/1999 | LeMole et al. |
| 6,124,778 A | 9/2000 | Rowley et al. |
| 6,219,789 B1 | 4/2001 | Little et al. |
| 6,480,963 B1 | 11/2002 | Tachibana et al. |
| 6,490,176 B2 | 12/2002 | Holzer et al. |
| 6,643,777 B1 | 11/2003 | Chu |
| 6,680,904 B1 | 1/2004 | Kaplan et al. |
| 6,812,803 B2 | 11/2004 | Goergen |
| 6,828,894 B1 | 12/2004 | Sorger et al. |
| 6,988,162 B2 | 1/2006 | Goergen |
| 7,164,255 B2 | 1/2007 | Hui |
| 7,200,692 B2 | 4/2007 | Singla et al. |
| 7,254,452 B2 | 8/2007 | Davlin et al. |
| 7,526,676 B2 | 4/2009 | Chou et al. |
| 7,529,862 B2 * | 5/2009 | Isani .................. G06F 13/28 710/110 |
| 7,660,998 B2 | 2/2010 | Walmsley |
| 7,746,846 B2 | 6/2010 | Boora et al. |
| 7,774,074 B2 | 8/2010 | Davlin et al. |
| 7,822,994 B2 | 10/2010 | Hamaguchi |
| 7,839,025 B2 | 11/2010 | Besser et al. |
| 7,872,561 B2 | 1/2011 | Matumoto |
| 7,960,870 B2 | 6/2011 | Besser et al. |
| 7,971,052 B2 | 6/2011 | Lucas et al. |
| 8,013,474 B2 | 9/2011 | Besser et al. |
| 8,032,745 B2 | 10/2011 | Bandholz et al. |
| 8,125,208 B2 | 2/2012 | Gyland |
| 8,132,231 B2 | 3/2012 | Amies et al. |
| 8,181,262 B2 | 5/2012 | Cooper et al. |
| 8,212,399 B2 | 7/2012 | Besser et al. |
| 8,266,360 B2 | 9/2012 | Agrawal |
| 8,310,380 B2 | 11/2012 | Aria et al. |
| 8,380,905 B2 | 2/2013 | Djabbari et al. |
| 8,862,802 B2 | 10/2014 | Calvin et al. |
| 8,868,813 B2 * | 10/2014 | Calvin .................. G06F 13/00 710/305 |
| 2002/0070835 A1 | 6/2002 | Dadafshar |
| 2002/0086678 A1 | 7/2002 | Salokannel et al. |
| 2002/0095573 A1 | 7/2002 | O'Brien |
| 2002/0171525 A1 * | 11/2002 | Kobayashi .............. H01F 38/14 336/107 |
| 2003/0202330 A1 | 10/2003 | Lopata et al. |
| 2005/0102535 A1 | 5/2005 | Patrick et al. |
| 2005/0144437 A1 | 6/2005 | Ransom et al. |
| 2005/0229004 A1 | 10/2005 | Callaghan |
| 2007/0072442 A1 * | 3/2007 | DiFonzo .............. H01R 13/641 439/39 |
| 2007/0076768 A1 | 4/2007 | Chiesa et al. |
| 2007/0177298 A1 | 8/2007 | Jaatinen et al. |
| 2008/0067874 A1 | 3/2008 | Tseng |
| 2008/0123669 A1 | 5/2008 | Oliveti et al. |
| 2008/0189441 A1 * | 8/2008 | Jundt .................... G05B 19/042 710/3 |
| 2008/0194124 A1 | 8/2008 | Di Stefano |
| 2009/0083843 A1 | 3/2009 | Wilkinson et al. |
| 2009/0245245 A1 | 10/2009 | Malwankar et al. |
| 2010/0052428 A1 | 3/2010 | Imamura et al. |
| 2010/0149997 A1 * | 6/2010 | Law .................... G05B 19/4185 370/248 |
| 2010/0151816 A1 * | 6/2010 | Besehanic ............ G06Q 30/02 455/405 |
| 2010/0233889 A1 | 9/2010 | Kiani et al. |
| 2011/0074349 A1 | 3/2011 | Ghovanloo |
| 2011/0080056 A1 | 4/2011 | Low et al. |
| 2011/0197009 A1 * | 8/2011 | Agrawal ................ G06F 13/423 710/305 |
| 2011/0291491 A1 | 12/2011 | Lemmens et al. |
| 2011/0296066 A1 | 12/2011 | Xia |
| 2011/0313547 A1 * | 12/2011 | Hernandez .......... G05B 19/042 700/23 |
| 2012/0102334 A1 | 4/2012 | O'Loughlin |
| 2012/0143586 A1 * | 6/2012 | Vetter .................. G05B 19/042 703/20 |
| 2012/0236769 A1 | 9/2012 | Powell et al. |
| 2012/0274273 A1 | 11/2012 | Jacobs et al. |
| 2012/0284354 A1 | 11/2012 | Mukundan et al. |
| 2012/0295451 A1 | 11/2012 | Hyun-jun et al. |
| 2012/0297101 A1 | 11/2012 | Neupartl et al. |
| 2012/0311071 A1 * | 12/2012 | Karaffa .............. G05B 19/41845 709/217 |
| 2013/0070788 A1 * | 3/2013 | Deiretsbacher ......... H04L 29/10 370/466 |

(56) References Cited

U.S. PATENT DOCUMENTS

| | | | |
|---|---|---|---|
| 2013/0173832 A1 | 7/2013 | Calvin et al. | |
| 2013/0211547 A1* | 8/2013 | Buchdunger | G05B 19/0426 700/11 |
| 2014/0341220 A1 | 11/2014 | Lessmann | |

FOREIGN PATENT DOCUMENTS

| | | |
|---|---|---|
| JP | 59177226 | 11/1984 |
| JP | 3370931 | 11/1999 |
| JP | 2002359131 | 12/2002 |
| JP | 2003047912 | 2/2003 |
| JP | 4439340 | 11/2005 |
| JP | 2007096817 | 4/2007 |
| KR | 1020020088540 | 11/2002 |
| KR | 100807377 | 2/2005 |
| KR | 1020060034244 | 4/2006 |
| KR | 100705380 | 4/2007 |
| TW | 201310344 | 3/2013 |

OTHER PUBLICATIONS

Search Report and Written Opinion dated Apr. 29, 2013 in International Application # PCT/US2012/072056.
Search Report and Written Opinion dated May 12, 2014 in International Application # PCT/US2013/053721.
Office Action dated Jan. 30, 2017 for CN Application No. 2,920,133.

\* cited by examiner

INPUT/OUTPUT MODULE WITH MULTI-CHANNEL SWITCHING CAPABILITY

CROSS-REFERENCE TO RELATED APPLICATIONS

The present application claims priority under 35 U.S.C. §119(e) to U.S. Provisional Application Ser. No. 62/114,030, filed Feb. 9, 2015, and titled "INPUT/OUTPUT MODULE WITH MULTI-CHANNEL SWITCHING CAPABILITY." The present application is also a continuation-in-part of International Application No. PCT/US2013/053721, filed Aug. 6, 2013, and titled "SECURE INDUSTRIAL CONTROL SYSTEM." The present application is also a continuation-in-part under 35 U.S.C. §120 of U.S. patent application Ser. No. 14/469,931, filed Aug. 27, 2014, and titled "SECURE INDUSTRIAL CONTROL SYSTEM." The present application is also a continuation-in-part under 35 U.S.C. §120 of U.S. patent application Ser. No. 14/446,412, filed Jul. 30, 2014, and titled "INDUSTRIAL CONTROL SYSTEM CABLE," which claims priority under 35 U.S.C. §119(e) to U.S. Provisional Application Ser. No. 62/021,438, filed Jul. 7, 2014, and titled "INDUSTRIAL CONTROL SYSTEM CABLE." The present application is also a continuation-in-part under 35 U.S.C. §120 of U.S. patent application Ser. No. 14/519,066, filed Oct. 20, 2014, and titled "OPERATOR ACTION AUTHENTICATION IN AN INDUSTRIAL CONTROL SYSTEM." The present application is also a continuation-in-part under 35 U.S.C. §120 of U.S. patent application Ser. No. 14/519,047, filed Oct. 20, 2014, and titled "INDUSTRIAL CONTROL SYSTEM REDUNDANT COMMUNICATIONS/CONTROL MODULES AUTHENTICATION." The present application is also a continuation-in-part under 35 U.S.C. §120 of U.S. patent application Ser. No. 14/597,498, filed Jan. 15, 2015, and titled "ELECTROMAGNETIC CONNECTOR," which is a continuation under 35 U.S.C. §120 of U.S. patent application Ser. No. 13/341,143, filed Dec. 30, 2011, and titled "ELECTROMAGNETIC CONNECTOR." The present application is also a continuation-in-part of International Application No. PCT/US2012/072056, filed Dec. 28, 2012 (having a priority date of Dec. 30, 2011), and titled "ELECTROMAGNETIC CONNECTOR AND COMMUNICATIONS/CONTROL SYSTEM/SWITCH FABRIC WITH SERIAL AND PARALLEL COMMUNICATIONS INTERFACES." The present application is also a continuation-in-part under 35 U.S.C. §120 of U.S. patent application Ser. No. 14/501,974, filed Sep. 30, 2014, and titled "SWITCH FABRIC HAVING A SERIAL COMMUNICATIONS INTERFACE AND A PARALLEL COMMUNICATIONS INTERFACE," which is a continuation under 35 U.S.C. §120 of U.S. patent application Ser. No. 13/341,161, filed Dec. 30, 2011, and titled "SWITCH FABRIC HAVING A SERIAL COMMUNICATIONS INTERFACE AND A PARALLEL COMMUNICATIONS INTERFACE." The present application is also a continuation-in-part under 35 U.S.C. §120 of U.S. patent application Ser. No. 14/502,006, filed Sep. 30, 2014, and titled "COMMUNICATIONS CONTROL SYSTEM WITH A SERIAL COMMUNICATIONS INTERFACE AND A PARALLEL COMMUNICATIONS INTERFACE," which is a continuation under 35 U.S.C. §120 of U.S. patent application Ser. No. 13/341,176, filed Dec. 30, 2011, and titled "COMMUNICATIONS CONTROL SYSTEM WITH A SERIAL COMMUNICATIONS INTERFACE AND A PARALLEL COMMUNICATIONS INTERFACE."

Each of the patent applications cross-referenced above is incorporated herein by reference in its entirety.

BACKGROUND

Industrial control systems, such as standard industrial control systems (ICS) or programmable automation controllers (PAC), include various types of control equipment used in industrial production, such as supervisory control and data acquisition (SCADA) systems, distributed control systems (DCS), programmable logic controllers (PLC), and industrial safety systems certified to safety standards such as IEC1508. These systems are used in industries including electrical, water and wastewater, oil and gas production and refining, chemical, food, pharmaceuticals and robotics. Using information collected from various types of sensors to measure process variables, automated and/or operator-driven supervisory commands from the industrial control system can be transmitted to various actuator devices such as control valves, hydraulic actuators, magnetic actuators, electrical switches, motors, solenoids, and the like. These actuator devices collect data from sensors and sensor systems, open and close valves and breakers, regulate valves and motors, monitor the industrial process for alarm conditions, and so forth.

In other examples, SCADA systems can use open-loop control with process sites that may be widely separated geographically. These systems use Remote Terminal Units (RTUs) to send supervisory data to one or more control centers. SCADA applications that deploy RTU's include fluid pipelines, electrical distribution and large communication systems. DCS systems are generally used for real-time data collection and continuous control with high-bandwidth, low-latency data networks and are used in large campus industrial process plants, such as oil and gas, refining, chemical, pharmaceutical, food and beverage, water and wastewater, pulp and paper, utility power, and mining and metals. PLCs more typically provide Boolean and sequential logic operations, and timers, as well as continuous control and are often used in stand-alone machinery and robotics. Further, ICE and PAC systems can be used in facility processes for buildings, airports, ships, space stations, and the like (e.g., to monitor and control Heating, Ventilation, and Air Conditioning (HVAC) equipment and energy consumption). As industrial control systems evolve, new technologies are combining aspects of these various types of control systems. For instance, PACs can include aspects of SCADA, DCS, and PLCs.

Within industrial control systems, communications/control modules typically communicate with field devices (e.g., actuators, sensors, and the like) via input/output modules. Technical advances have created a demand for enhanced connectivity between field devices and higher level enterprise and industrial systems and a greater need for connectivity among the devices themselves. In this regard, industrial systems are evolving in a similar manner to the "internet of things" but with much higher security, reliability, and throughput requirements. Robust and secure input/output modules are needed to accommodate the emerging needs in industrial communications and control systems.

SUMMARY

The present disclosure is directed to an input/output module with multi-channel switching capability that can be securely embedded within a communications backplane of an industrial control system. In some embodiments, the input/output module includes a plurality of communication channels, where each of the channels is configured to connect to one or more field devices. Switch fabric within the input/output module selectively facilitates connectivity between an external control module and the one or more field devices via the communication channels. In order to facilitate interconnectivity via the communications backplane, the input/output module can further include a serial communications port and a parallel communications port. The serial communications port can connect the input/output module to the control module in parallel with at least one additional (second) input/output module, where the serial communications port transmits information between the input/output module and the control module. The parallel communications port can separately connect the input/output module to the control module, where the parallel communications port transmits information between the input/output module and the control module, and also transmits information between the input/output module and the second input/output module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Input/output (I/O) modules are used in industrial control systems to establish communication between communications/control modules and field devices (e.g., actuators, sensors, and the like). Technical advances have created a demand for enhanced connectivity between field devices and higher level enterprise and industrial systems and a greater need for connectivity among the field devices themselves. In this regard, industrial systems are evolving in a similar manner to the "internet of things" but with much higher security, reliability, and throughput requirements. Multi-port switches can be used to securely facilitate TCP/IP communication protocols, among others. However, a switch (e.g., multi-port Ethernet switch) typically resides outside of an industrial control system communications backplane and can be more vulnerable to security threats as a result, possibly endangering devices communicatively coupled to the industrial control system via the switch and potentially placing the industrial control system as a whole at risk.

An I/O module with multi-channel switching capability is disclosed, where the I/O module is configured to be securely embedded within a communications backplane of an industrial control system. In some embodiments, the input/output module includes a plurality of communication channels that can be configured to accommodate a variety of communication protocols such as, but not limited to, Ethernet bus, H1 field bus, Process Field Bus (PROFIBUS), Highway Addressable Remote Transducer (HART) bus, Modbus, and Object Linking and Embedding for Process Control Unified Architecture (OPC UA) communication standards. In some embodiments, two or more distinct communication standards can be concurrently run on respective ones of the communication channels. For example, a first channel may run an OPC UA protocol while a second channel is running PROFIBUS, and so forth.

Example Implementations

Figure 1:
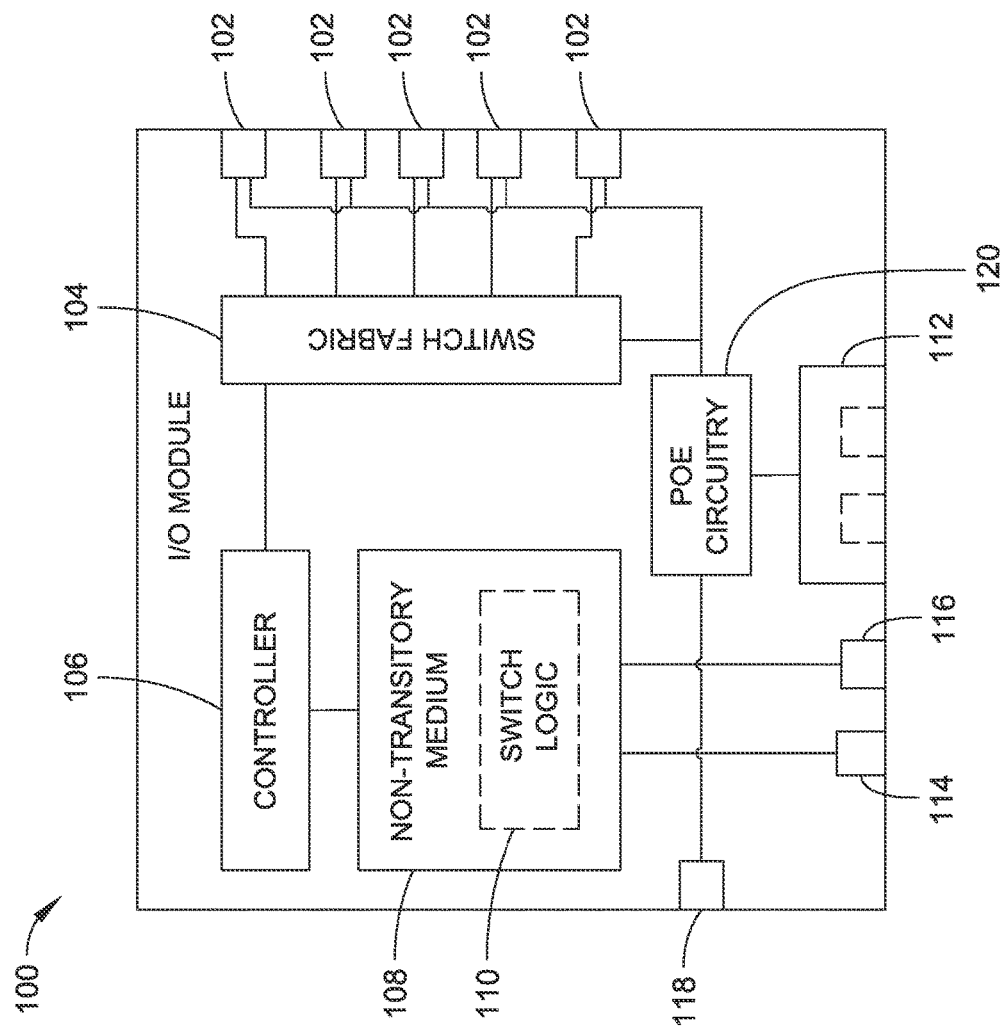
FIG. 1 is a block diagram illustrating an input/output module in accordance with embodiments of this disclosure.

FIG. 1 illustrates an I/O module 100 in accordance with embodiments of this disclosure. The I/O module 100 may include a plurality of communication channels 102, such as Ethernet channels or the like. The communication channels 102 can be used to connect to field devices within a distributed control system, such as the industrial control system 200 illustrated in FIG. 2 and described in further detail below. For example, each channel of the plurality of communication channels can be configured to connect to one or more field devices 217, such as actuator devices 218 and sensor devices 220 including, but not limited to, control valves, hydraulic actuators, magnetic actuators, motors, solenoids, electrical switches, transmitters, input sensors/receivers (e.g., illumination, radiation, gas, temperature, electrical, magnetic, and/or acoustic sensors), communications sub-busses, and the like. Switch fabric 104 within the I/O module can be configured to selectively facilitate connectivity (e.g., transfer of information/data) between an external control module (e.g., communications/control module 214) and the one or more field devices 217 via the plurality of communication channels 102.

In embodiments, the I/O module 100 includes a controller 106, such as a microprocessor, microcontroller, ASIC, FPGA, or other single or multiple core processing unit, configured to control the switch fabric 104. For example, the controller 106 can be configured to set arbitration rules or priorities for the switch fabric and so forth. The controller 106 may be configured to run/execute switch logic 110 (e.g., program instructions) for controlling the switch fabric 104 from a non-transitory medium 108 (e.g., flash or solid-state memory device) that is communicatively coupled to the controller 106. In some embodiments, the I/O module 100 is operable as an OPC UA client and/or server. For example, the controller 106 can be configured to run/execute switch logic 110 that causes the controller 106 to implement OPC UA client or server communications/control protocols.

In some embodiments, the controller 106 is configured to accommodate multiple communication standards running concurrently on respective channels 102. For example, a first channel 102 can be configured by the controller 106 to send and receive information utilizing a PROFIBUS protocol, and a second concurrently operable channel 102 can be configured by the controller 106 to send and receive information utilizing an OPC UA protocol. In general, two or more communication standards may be concurrently implemented via respective channels 102, where the communication standards can include, but are not limited to, Ethernet bus, H1 field bus, PROFIBUS, HART bus, Modbus, and OPC UA communication standards.

The I/O module 100 may be further configured to synchronize timing of connected field devices 217 according to a timing protocol, such as the IEEE 1588 Precision Time Protocol (PTP). In this regard, the I/O module 100 can implement a time distribution system, where the I/O module 100 is a synchronization master device or an intermediate synchronization device, the field devices 217 being lower than the I/O module 100 in the timing control hierarchy.

In addition to establishing connectivity to the field device 217 via communication channels 102, the I/O module 100 can be further configured to supply power to the field devices 217. In some embodiments, for example, the I/O module 100 includes Power-Over-Ethernet (POE) circuitry 120 configured to distribute incoming electrical power to one or more of the communication channels 102. Power may be supplied to the I/O module via a power backplane connection port 112 (e.g., E-core connection port) or an input jack 118. For example, the input jack 118 may be coupled to an external power source (e.g., local generator, backup power supply, etc.). In embodiments, the controller 106 can be configured to selectively enable power transfer via the communication channels 102. For example, POE functionality can be enabled for communication channels 102 coupled to field devices 217 having POE capabilities (e.g., low voltage actuators 218, sensor 220, or communication devices). Where a device 217 is configured to be powered by another source (e.g., connection to the power backplane 234, internal/external battery, or other internal/external power source), the controller 106 may be configured to disable POE functionality of the respective communication channel 102 that is coupled with the device 217.

The I/O module 100 further includes one or more connection ports (e.g., I-core connection ports) that facilitate interconnectivity with at least one communications/control module 214 via a communications backplane (e.g., switch fabric 202). In some embodiments, the I/O module 100 includes at least one serial communications port 114 and at least one parallel communications port 116. The serial communications port 114 can connect the I/O module 100 to the communications/control module 214 in parallel with at least one additional (second) I/O module 100. For example, the first and second I/O modules 100 can be concurrently connected to the communications/control module 214 via respective serial interface connections 204, where each I/O module 100 can receive information from and transmit information to the communications/control module 214 via the respective serial interface 204. The parallel communications port 116 can separately connect the I/O module 100 to the communications/control module 214 via a parallel communications interface 206, where the I/O module 100 can receive information from and transmit information to the communications/control module 214 via the parallel communications interface 206. The I/O module 100 can also communicate with other I/O modules 100 via the parallel communications port 116 and interface 206.

In embodiments, one or more ports (e.g., serial communication port 114, parallel communication port 116, power backplane input 112, and/or input jack 118) of the I/O module comprise or are coupled with electromagnetic connectors 207 of connector assemblies 208, such as those described in U.S. patent application Ser. No. 13/341,143 (Pub. No. US 2013/0170258) and Ser. No. 14/597,498, and in International Application No. PCT/US2012/072056 (International Pub. No. WO/2013/102069), all of which are entirely incorporated herein by reference. The electromagnetic connectors 207 may be used in any application where it is desirable to couple electrical circuits together for transmitting electrical signals and/or electrical power from one circuit to another, while maintaining isolation between the circuits. The electromagnetic connectors 207 can be used in applications including, but not necessarily limited to: industrial control systems/process control systems (e.g., to connect I/O modules 100 with power and/or communications signal transmission circuitry), telecommunications (e.g., for audio, broadband, video, and/or voice transmission), information/data communications (e.g., for connecting computer networking equipment, such as Ethernet equipment, modems, and so forth), computer hardware interconnection (e.g., for connecting peripherals, such as joysticks, keyboards, mice, monitors, and so on), game consoles, test/measurement instruments, electrical power connectors (e.g., for power transmission from AC mains), and the like.

Each one of the electromagnetic connectors 207 is configured to form a magnetic circuit portion, which includes a core member and a coil disposed of (e.g., around or within) the core member. For the purposes of the present disclosure, it should be noted that "core member" is used to refer to an incomplete part of a magnetic core, which is completed by another core member when the electromagnetic connectors 207 are coupled together. Each electromagnetic connector 207 is configured to mate with another electromagnetic connector 207 of a connector assembly 208 for transmitting power and/or communications signals between components that are connected via the electromagnetic connectors 207. For example, a first core member of an electromagnetic connector 207 can be configured to contact a second core member of another electromagnetic connector 207 when the first electromagnetic connector 207 is mated with the second electromagnetic connector 207. In this manner, a coil of the first electromagnetic connector 207 can be tightly coupled to another coil of the second electromagnetic connector 207 with a magnetic circuit formed from the magnetic circuit portion of the first electromagnetic connector 207 and the magnetic circuit portion of the second electromagnetic connector 207. The magnetic circuit is configured to induce a signal in one of the coils when the other coil is energized, allowing power and/or communications signals to be transmitted between components that are connected via the electromagnetic connectors 207. In implementations, the coils can be tightly coupled (e.g., using an iron core to provide a coupling coefficient of about one (1)), critically coupled (e.g., where energy transfer in the passband is optimal), or overcoupled (e.g., where a secondary coil is close enough to a primary coil to collapse the primary coil's field).

The first core member may not necessarily be configured to contact the second core member when the first electromagnetic connector 207 is mated with the second electromagnetic connector 207. Thus, an electromagnetic connector assembly 208 can be configured to transmit power and/or communications signals between components that are connected via electromagnetic connectors 207 using, for example, an interference fit configuration, where one coil is disposed around a first core member, while another coil is disposed within a second core member. The interference fit may be established using connectors having geometries including, but not necessarily limited to: conical, concentric, eccentric, geometric, sloped for friction fit, and so forth.

In implementations, one or both of the core members and/or coils can be at least partially (e.g., fully or partially) mechanically encased within a protective layer. The protective layer may be fabricated of a non-conductive/insulating material, such as a coating of thin film plastic material. The protective layer (e.g., non-conductive/insulating material) can be applied using techniques including, but not necessarily limited to: coating, painting, deposition, and so forth. For instance, the core member and coil of a first electromagnetic connector 207 included within the I/O module 100 can be partially enclosed by a cover, while a second electromagnetic connector 207 included within the power or communications backplane 202/234 may include a shaft configured to mate with the cover. In this manner, the cover and the shaft may be configured to ensure proper alignment of the first electromagnetic connector 207 with the second electromagnetic connector 207, while protecting the core members and/or the coil of the first electromagnetic connector 207 from corrosion, mechanical damage (e.g., fracture), and so forth. Encasement may be especially useful when a core member is constructed from a brittle material. For instance, the core member can be tightly encased in a protective layer formed of a plastic material. In this manner, when damage to the core member (e.g., cracks or breaks in the core member) occurs, the pieces of material can be maintained in substantial contact with one another within the casing, thus damage to the core material may not significantly decrease performance.

When the electromagnetic connectors 207 are mated, a core member of the power or communications backplane 202/234 and a core member of the I/O module 100 may be configured to couple the coils via a magnetic circuit. The magnetic circuit may induce a signal in a coil of the I/O module 100 when a respective coil of the power or communications backplane 202/234 is energized (e.g., with the AC signal from a DC/AC converter). The signal induced in the coil of the I/O module 100 may be used to power and/or furnish communications with circuitry of the module 100. It should be noted that while power or communications backplane 202/234 is described as inducing a signal in the I/O module 100, this implementation is provided by way of example only and is not meant to be restrictive of the present disclosure. The magnetic circuit can also be used to induce a signal in a coil of the power or communications backplane 202/234 when a coil of the I/O module 100 is energized to power and/or furnish communications with the power or communications backplane 202/234 (e.g., transmission of communications via switch fabric 202 to the communications/control module 214). Further, the coils included with mating electromagnetic connectors 207 may be energized in an alternating sequence (e.g., one after another) to provide bidirectional communication, and so forth.

Figure 2:
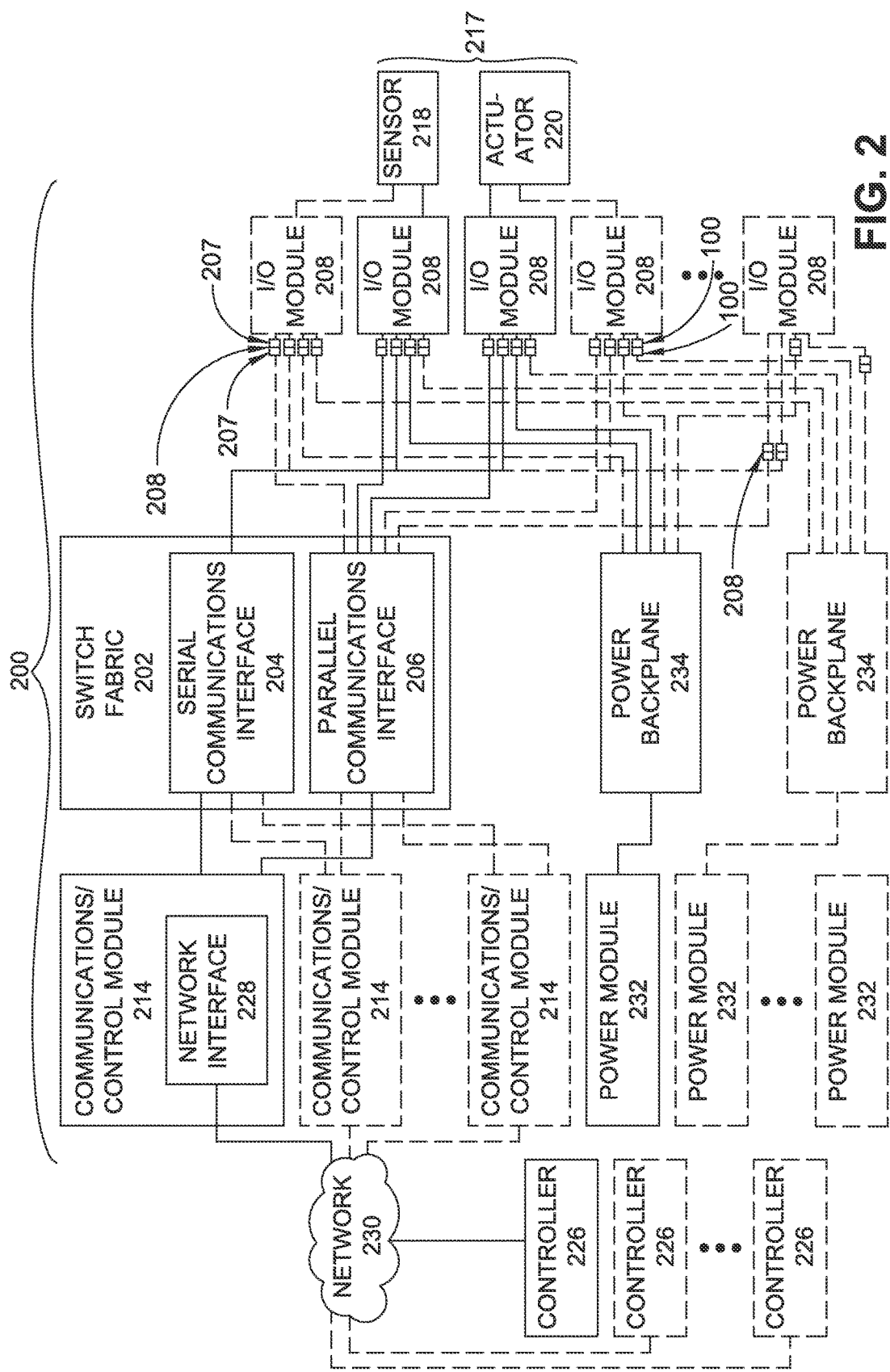
FIG. 2 is a block diagram illustrating an industrial control system in accordance with embodiments of this disclosure.

FIGS. 2-9 illustrate an industrial control system 200 in accordance with various embodiments of this disclosure. In embodiments, the industrial control system 200 may comprise an industrial control system (ICS), a programmable automation controller (PAC), a supervisory control and data acquisition (SCADA) system, a distributed control system (DCS), programmable logic controller (PLC), and industrial safety system certified to safety standards such as IEC1508, or the like. As shown in FIG. 2, the industrial control system 200 uses a communications control architecture to implement a distributed control system that includes one or more industrial elements (e.g., input/output modules, power modules, field devices, switches, workstations, and/or physical interconnect devices) that are controlled or driven by one or more control elements or subsystems distributed throughout the system. For example, one or more I/O modules 100 may be connected to one or more communications/control modules 214.

The industrial control system 200 is configured to transmit data to and from the I/O modules 100. The I/O modules 100 can comprise input modules, output modules, and/or input and output modules. For instance, input modules can be used to receive information from input field devices 217 (e.g., sensors 218), while output modules can be used to transmit instructions to output field devices 217 (e.g., actuators 220). For example, an I/O module 100 can be connected to a process sensor for measuring pressure in piping for a gas plant, a refinery, and so forth and/or connected to a process actuator for controlling a valve, binary or multiple state switch, transmitter, or the like. Field devices 217 are communicatively coupled with the IO modules 100 either directly or via network connections. For example, the field device 217 can be connective via communication channels 102 accommodating one or more TCP/IP standards. These devices 217 can include control valves, hydraulic actuators, magnetic actuators, motors, solenoids, electrical switches, transmitters, input sensors/receivers (e.g., illumination, radiation, gas, temperature, electrical, magnetic, and/or acoustic sensors) communications sub-busses, and the like.

The industrial control system 200 includes switch fabric 202 facilitating interconnectivity of a communications backplane. In embodiments, the switch fabric 202 comprises a serial communications interface 204 and a parallel communications interface 206 for furnishing communications with a number of I/O modules 100. As shown in FIGS. 2-9, the I/O modules 100 can be connected to the industrial control system 200 using one or more electromagnetic connectors 207. For instance, each I/O module 100 can include or can be coupled to one or more electromagnetic connectors 207 or connector assemblies 208, with core members extending through coils. In some embodiments, the coils can be implemented as planar windings on a circuit board. When included in an I/O module 100, the circuit board can be "floated" against a partial spring load, allowing for some movement of the circuit board perpendicular to the plane of a core member, e.g., to compensate for tolerances across the circuit board. For example, a self-holding spring loading mechanism can be provided in the module to provide a constant downward pressure to facilitate mating of the electromagnetic connection, compensating for stacked tolerances of the module, PCB, and baseplate/support frame and ensuring a constant mating of both halves of an electromagnetic connector assembly.

In some embodiments, a "tongue and groove" configuration can be used that provides inherent fastening and support in three planes. For example, a printed circuit board included within an I/O module 100 can be configured to slide along and between two track segments in a direction perpendicular to the plane of a core member. Further, a core member can be mechanically isolated from (e.g., not touching) the circuit board. It should be noted that the implementation with planar primary and secondary windings is provided by way of example only and is not necessarily meant to be restrictive of the present disclosure. Thus, other implementations can use other coil configurations, such as wire wound coils, and so forth. For example, the primary coil may comprise a planar winding, and the secondary coil may comprise a wire wound coil. Further, the primary coil may comprise a wire wound coil, and the secondary coil may comprise a planar winding. In other implementations, primary and secondary coils may both comprise wire wound coils.

Figure 3:
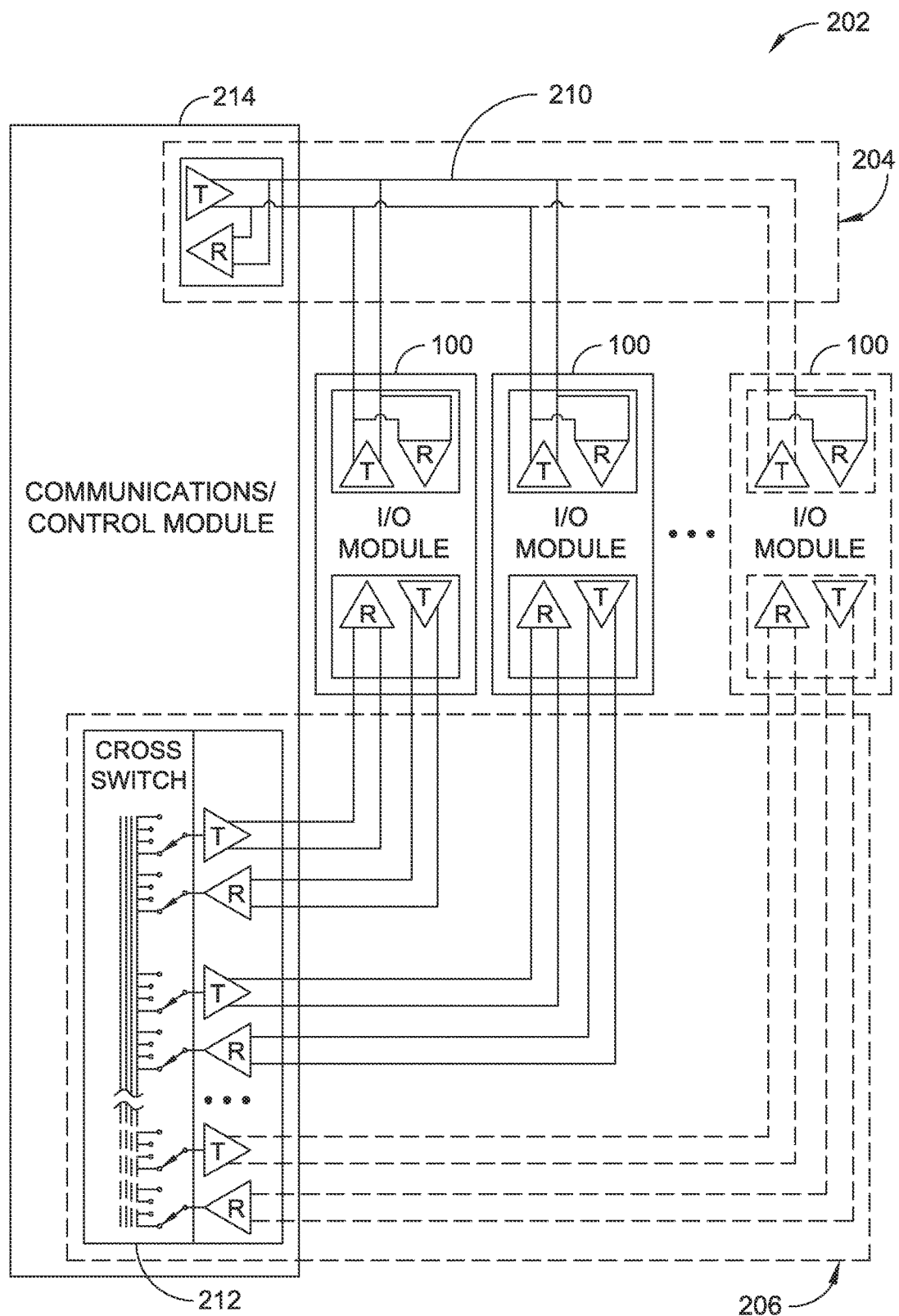
FIG. 3 is a block diagram illustrating a switch fabric in accordance with embodiments of this disclosure.
Figure 4:
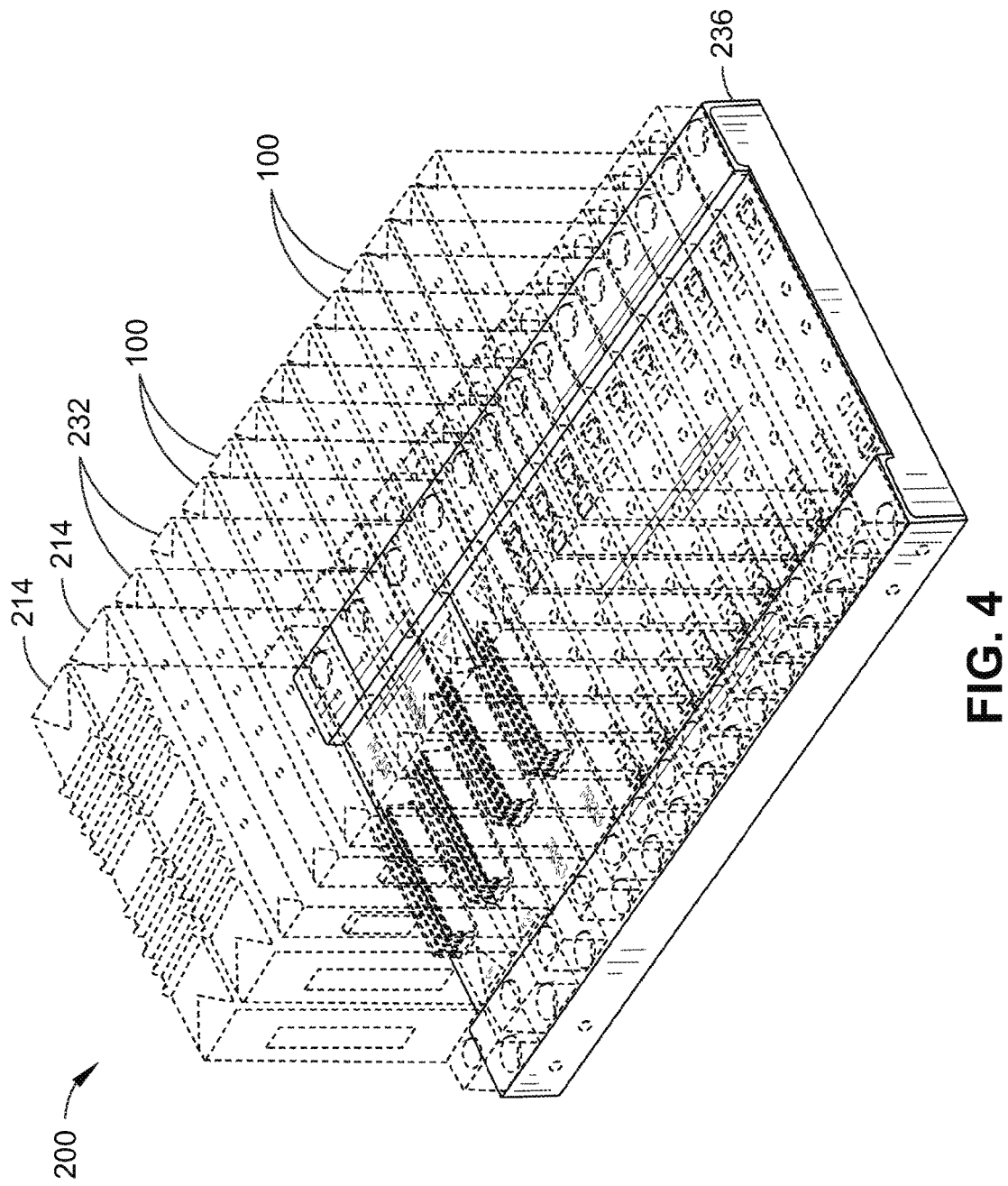
FIG. 4 is an isometric view illustrating an industrial control system in accordance with embodiments of this disclosure.
Figure 5:
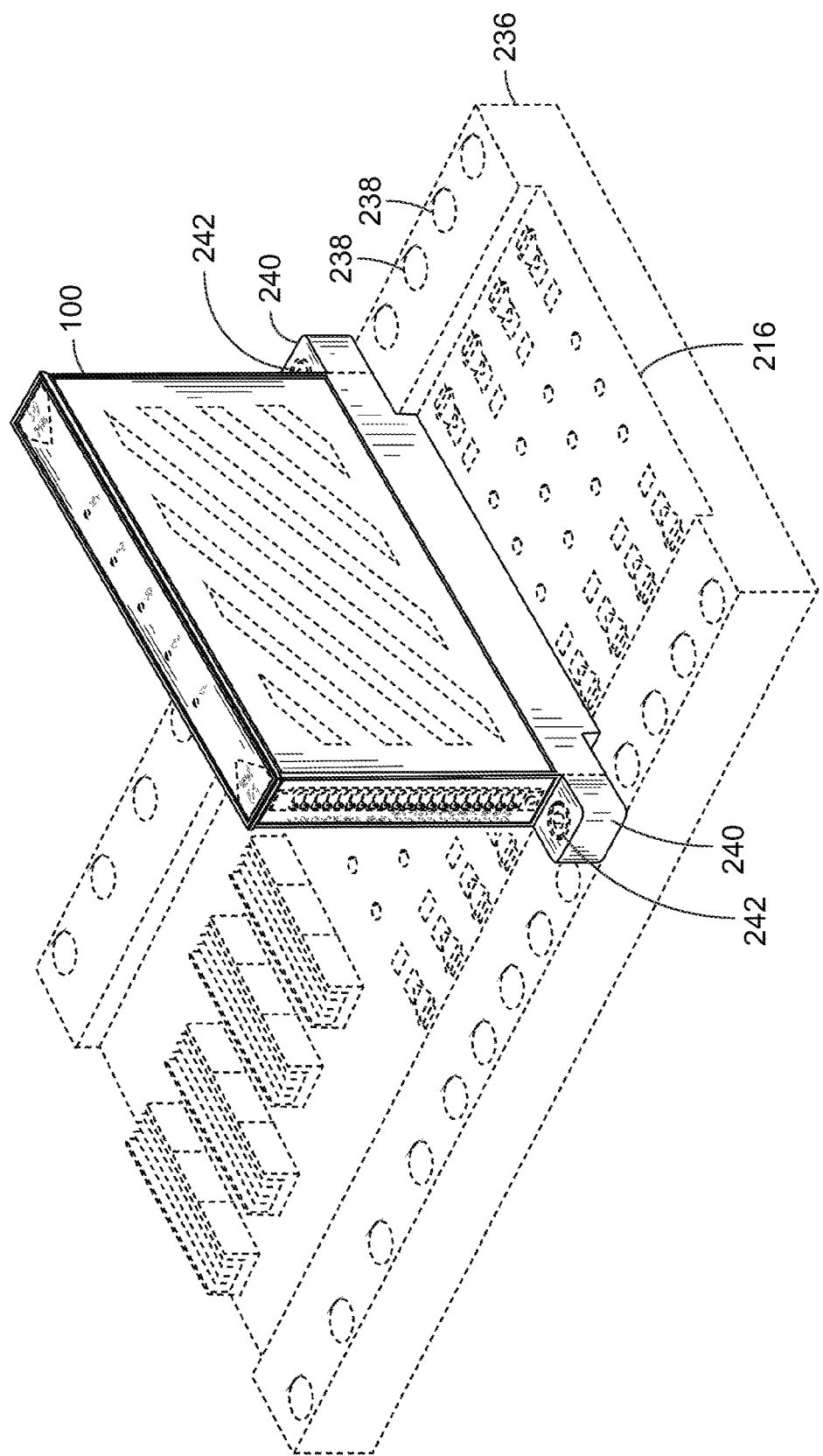
FIG. 5 is an isometric view of an input/output module coupled to a support frame of the industrial control system illustrated in FIG. 4.
Figure 6:
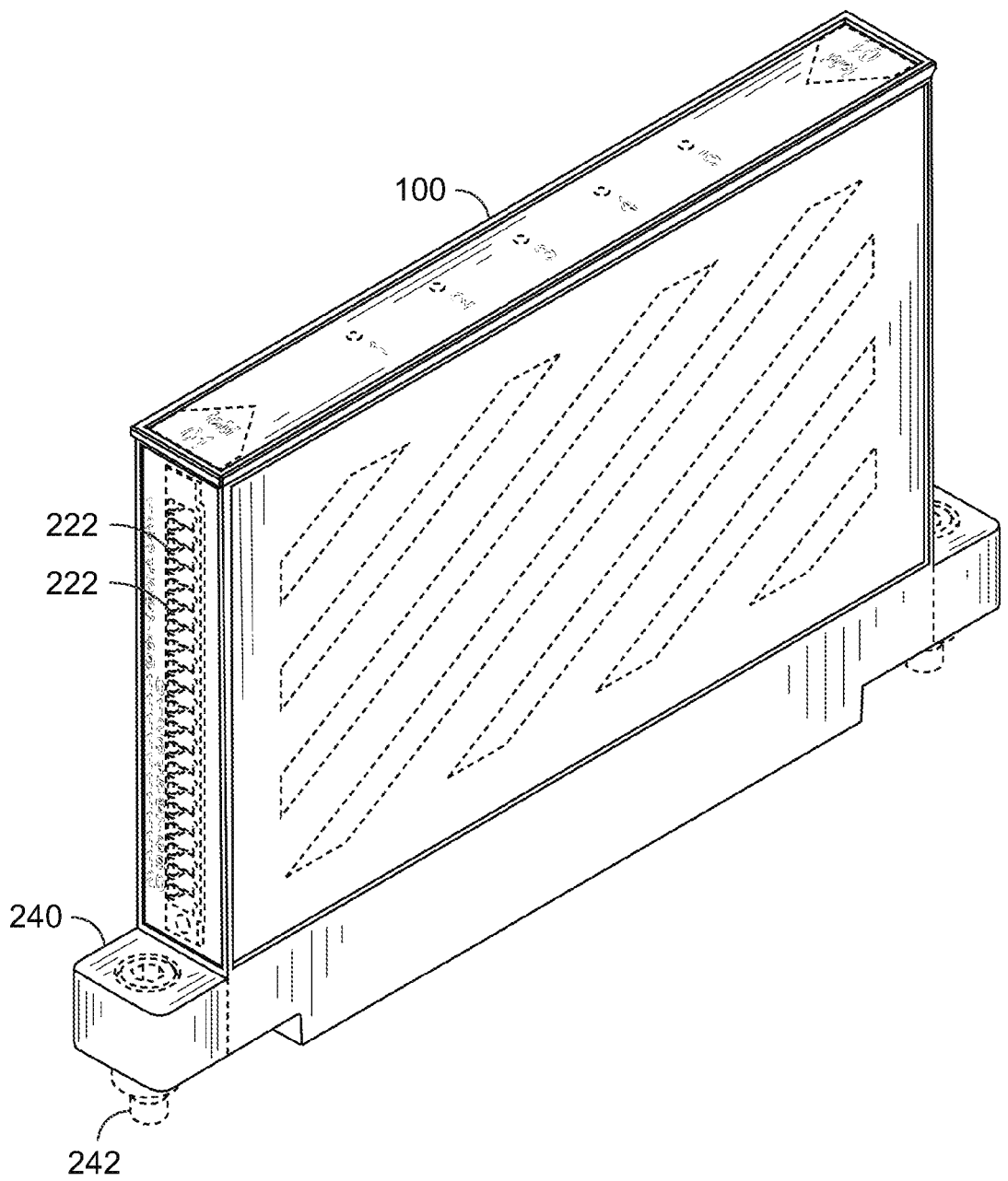
FIG. 6 is an isometric view of the input/output module illustrated in FIG. 4.
Figure 7:
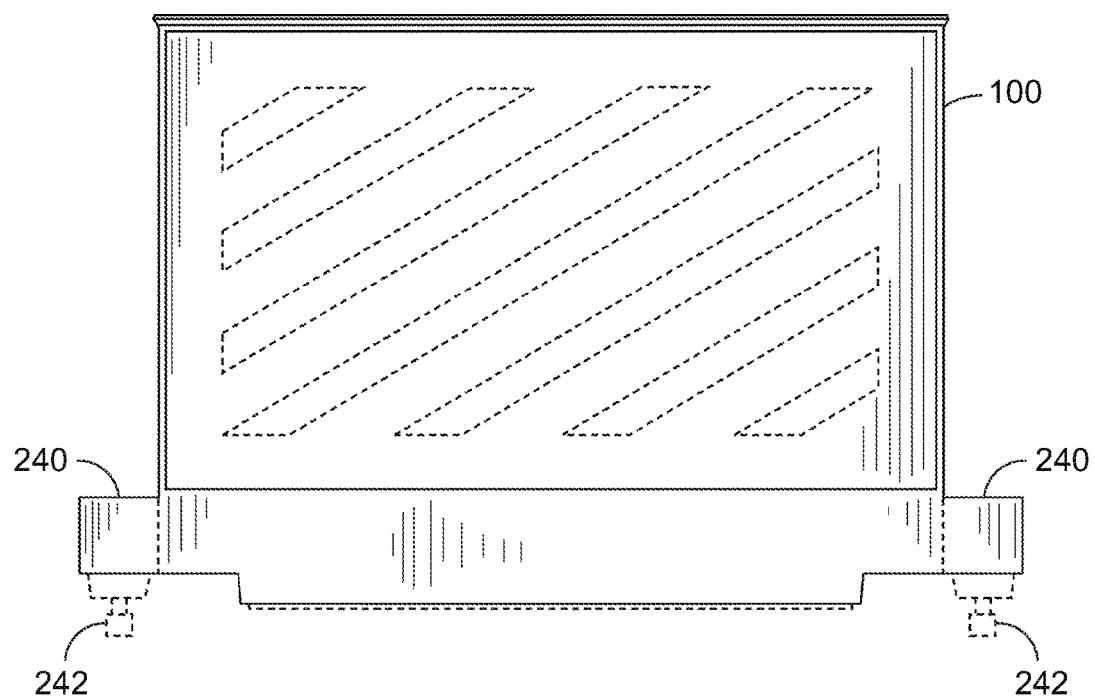
FIG. 7 is a side view of the input/output module illustrated in FIG. 4.
Figure 8:
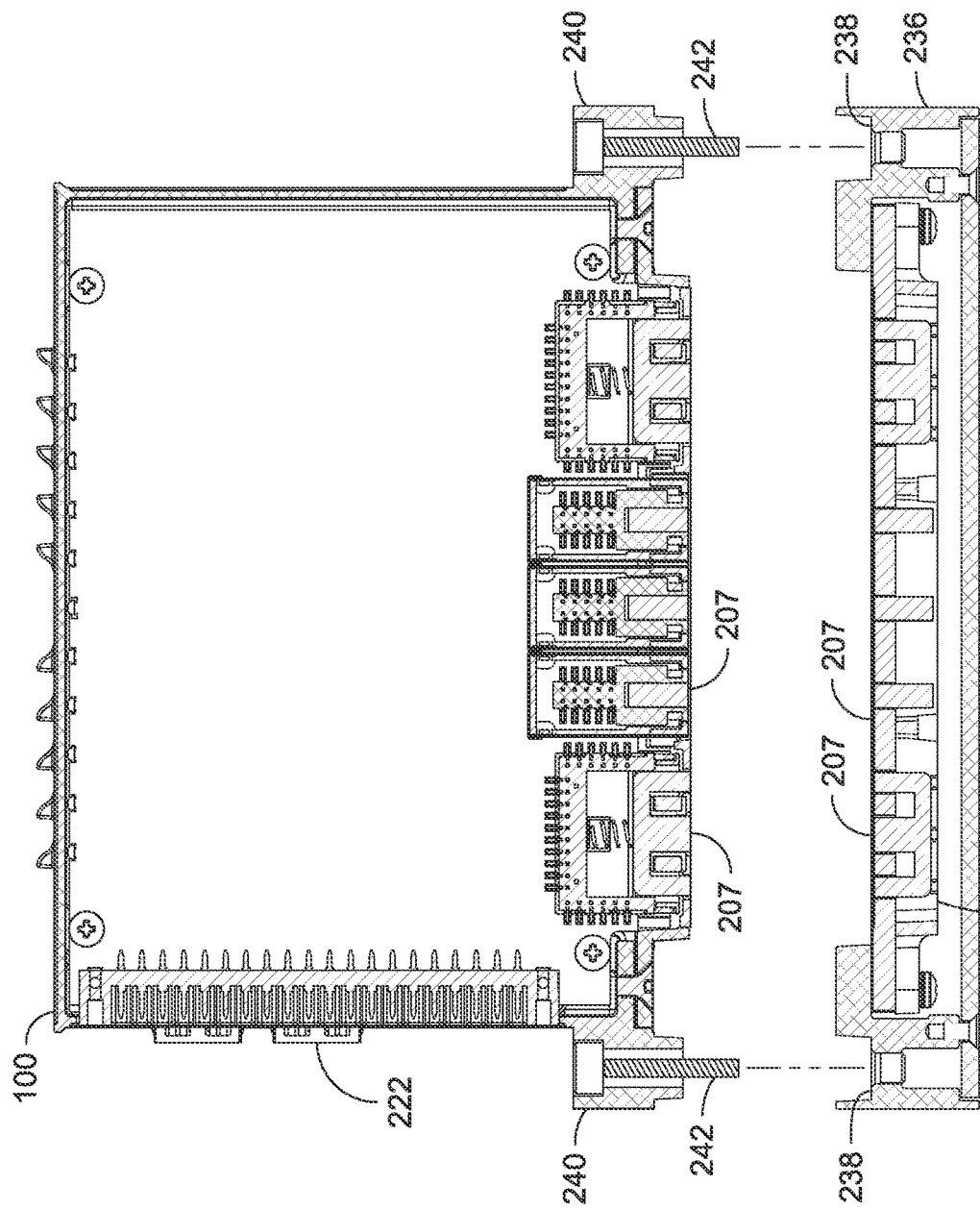
FIG. 8 is a cross-sectional side view of the input/output module and the support frame of the industrial control system illustrated in FIG. 4.

FIG. 3 shows an embodiment of the switch fabric 202. The switch fabric 202 may be configured for use with any systems technology, such as telecommunications network technology, computer network technology, process control systems technology, and so forth. For example, the switch fabric 202 may be used with a distributed control system comprised of controller elements and subsystems, where the subsystems are controlled by one or more controllers distributed throughout the system. The switch fabric 202 includes a serial communications interface 204 and a parallel communications interface 206 for furnishing communications with a number of slave devices.

The serial communications interface 204 may be implemented using a group of connectors connected in parallel with one another. In some embodiments, the connectors may be configured as electromagnetic connectors 207/connector assemblies 208 (e.g., as previously described). For example, the serial communications interface 204 may be implemented using a multidrop bus 210, or the like. In implementations, the multidrop bus 210 may be used for configuration and diagnostic functions of the I/O modules 100/slave devices. The parallel communications interface 206 allows multiple signals to be transmitted simultaneously over multiple dedicated high speed parallel communication channels. For instance, the parallel communications interface 206 may be implemented using a cross switch 212, or the like.

In an embodiment shown in FIG. 3, the parallel communications interface 206 may be implemented using a four (4) wire full duplex cross switch 212 with a dedicated connection to each I/O module 100/slave device. In implementations, each connection may be furnished using one or more electromagnetic connectors 207/connector assemblies 208 (e.g., as previously described). The cross switch 212 can be implemented as a programmable cross switch connecting point-to-point busses and allowing traffic between the I/O modules 100/slave devices. The cross switch 212 may be configured by a master device, such as a communications/control module 214. For example, the communications/control module 214/master device may configure one or more sets of registers included in the cross switch 212 to control traffic between the I/O modules 100/slave devices. In implementations, a communications/control module 214/master device may comprise a rule set dictating how the I/O modules 100/slave devices are interconnected. For example, a communications/control module 214/master device may comprise a set of registers, where each register defines the operation of a particular switch (e.g., with respect to how packets are forwarded, and so forth). Thus, the cross switch 212 may not necessarily auto-configure, instead implementing a configuration provided by a communications/control module 214/the master device. However, this configuration is provided by way of example only and is not meant to be restrictive of the present disclosure. Thus, in other implementations, the cross switch 212 may auto-configure.

The parallel communications interface 206 may be used for data collection from the I/O modules 100/slave devices. Further, because each I/O module 100/slave device has its own private bus to the communications/control module 214/master device, each I/O module 100/slave device can communicate with the communications/control module 214 at the same time. Thus, the total response time for the industrial control system 200/switch fabric 202 may be limited to that of the slowest I/O module 100/slave device, instead of the sum of all slave devices, as in the case of a typical multidrop bus.

Figure 9:
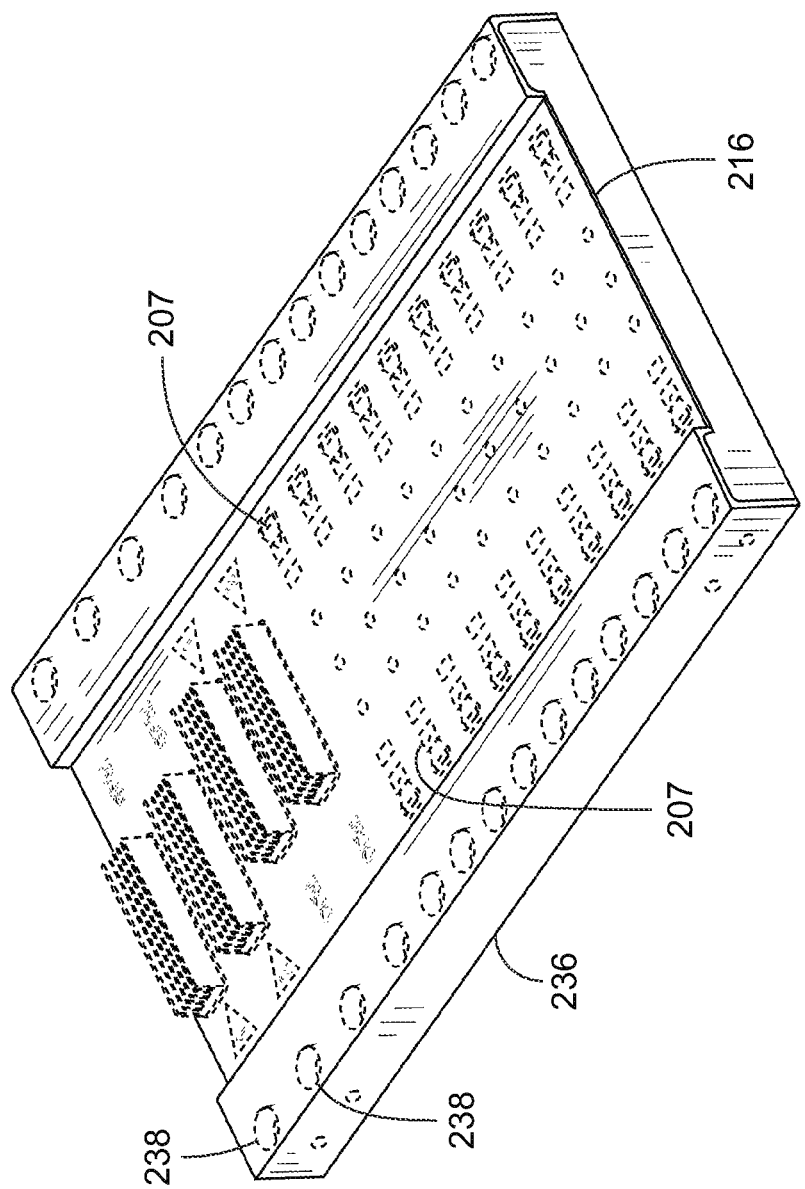
FIG. 9 is an isometric view of the support frame with an attached circuit board for the industrial control system illustrated in FIG. 4.

In implementations, the switch fabric 202, the serial communications interface 204, and the parallel communications interface 206 may be implemented in a single, monolithic circuit board 216, e.g., with multiple E-shaped core members of electromagnetic connectors 207 extending through the circuit board 216, as shown in FIG. 9. In implementations, the core members may be mechanically isolated from the circuit board 216 (e.g., not touching the circuit board 216). However, this configuration is provided by way of example only and is not meant to be restrictive of the present disclosure. Thus, the serial communications interface 204 and the parallel communications interface 206 may be implemented using different arrangements of multiple components, such as multiple discrete semiconductor devices for implementing the serial communications interface 204 and the parallel communications interface 206 separately, and so forth.

The switch fabric 202 may be configured for connecting one or more I/O modules 100 (e.g., as slave devices) and transmitting data to and from the I/O modules 100. The I/O modules 100 may comprise input modules, output modules, and/or input and output modules. For instance, input modules can be used to receive information from input instruments in the process or the field, while output modules can be used to transmit instructions to output instruments in the field. For example, an I/O module 100 can be connected to a process sensor, such as a sensor 218 for measuring pressure in piping for a gas plant, a refinery, and so forth. In implementations, the I/O modules 100 can be used the industrial control system 200 collect data in applications including, but not necessarily limited to critical infrastructure and/or industrial processes, such as product manufacturing and fabrication, utility power generation, oil, gas, and chemical refining; pharmaceuticals, food and beverage, pulp and paper, metals and mining and facility and large campus industrial processes for buildings, airports, ships, and space stations (e.g., to monitor and control Heating, Ventilation, and Air Conditioning (HVAC) equipment and energy consumption).

In implementations, an I/O module 100 can be configured to convert analog data received from the sensor to digital data (e.g., using Analog-to-Digital Converter (ADC) circuitry, and so forth). An I/O module 100 can also be connected to one or more process actuators 220 such as a motor or a regulating valve or an electrical relay and other forms of actuators and configured to control one or more operating characteristics of the motor, such as motor speed, motor torque, or position of the regulating valve or state of the electrical relay and so forth. Further, the I/O module 100 can be configured to convert digital data to analog data for transmission to the actuator 220 (e.g., using Digital-to-Analog (DAC) circuitry, and so forth). In implementations, one or more of the I/O modules 100 can comprise a communications module configured for communicating via a communications sub-bus, such as an Ethernet bus, an H1 field bus, a PROFIBUS, a HART bus, a Modbus, an OPC UA bus, and so forth. Further, two or more I/O modules 100 can be used to provide fault tolerant and redundant connections for various field devices 217 such as control valves, hydraulic actuators, magnetic actuators, motors, solenoids, electrical switches, transmitters, input sensors/receivers (e.g., illumination, radiation, gas, temperature, electrical, magnetic, and/or acoustic sensors) communications sub-busses, and the like.

Each I/O module 100 may be provided with a unique identifier (ID) for distinguishing one I/O module 100 from another I/O module 100. In implementations, an I/O module 100 may be identified by its ID when it is connected to the industrial control system 200. Multiple I/O modules 100 can be used with the industrial control system 200 to provide redundancy. For example, two or more I/O modules 100 can be connected to the sensor 218, actuator 220, or any other field device 217, as shown in FIG. 2. Each I/O module 100 can include one or more ports 222 furnishing a physical connection to hardware and circuitry included with the I/O module 100, such as a Printed Circuit Board (PCB) 224, and so forth.

One or more of the I/O modules 100 can include an interface for connecting to other networks including, but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 100 can include a connection for connecting an I/O module 100 to a computer bus, and so forth.

The communications/control modules 214 can be used to monitor and control the I/O modules 100, and to connect two or more I/O modules 100 together. In embodiments of the disclosure, a communications/control module 214 can update a routing table when an I/O module 100 is connected to the industrial control system 200 based upon a unique ID for the I/O module 100. Further, when multiple redundant I/O modules 100 are used, each communications/control module 214 can implement mirroring of informational databases regarding the I/O modules 100 and update them as data is received from and/or transmitted to the I/O modules 100. In some embodiments, two or more communications/control module 214 are used to provide redundancy. For added security, the communications/control module 214 can be configured to perform an authentication sequence or handshake to authenticate one another at predefined events or times including such as startup, reset, installation of a new control module 214, replacement of a communications/control module 214, periodically, scheduled times, and the like. The I/O modules 100 can also be configured to perform an authentication sequence or "handshake," as illustrated in FIGS. 10-15 and described in further detail below.

Data transmitted using the switch fabric 202 may be packetized, i.e., discrete portions of the data may be converted into data packets comprising the data portions along with network control information, and so forth. The industrial control system 200/switch fabric 202 may use one or more protocols for data transmission, including a bit-oriented synchronous data link layer protocol such as High-Level Data Link Control (HDLC). In a specific instance, the industrial control system 200/switch fabric 202 may implement HDLC according to an International Organization for Standardization (ISO) 13239 standard, or the like. Further, two or more communications/control modules 214 can be used to implement redundant HDLC. However, it should be noted that HDLC is provided by way of example only and is not meant to be restrictive of the present disclosure. Thus, the industrial control system 200 may use other various communications protocols in accordance with the present disclosure.

One or more of the communications/control modules 214 may be configured for exchanging information with components used for monitoring and/or controlling the instrumentation connected to the switch fabric 202 via the I/O modules 100, such as one or more control loop feedback mechanisms/controllers 226. In implementations, a controller 226 can be configured as a microcontroller/Programmable Logic Controller (PLC), a Proportional-Integral-Derivative (PID) controller, and so forth. One or more of the communications/control modules 214 may include a network interface 228 for connecting the industrial control system 200 to a controller 226 via a network 230. In implementations, the network interface 228 may be configured as a Gigabit Ethernet interface for connecting the switch fabric 202 to a Local Area Network (LAN). Further, two or more communications/control modules 214 can be used to implement redundant Gigabit Ethernet. However, it should be noted that Gigabit Ethernet is provided by way of example only and is not meant to be restrictive of the present disclosure. Thus, the network interface 228 may be configured for connecting the industrial control system 200 to other various networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Additionally, the network interface 228 may be implemented using computer bus. For example, the network interface 228 can include a Peripheral Component Interconnect (PCI) card interface, such as a Mini PCI interface, and so forth. Further, the network 230 may be configured to include a single network or multiple networks across different access points.

The industrial control system 200 may include one or more power modules 232 for supplying electrical power to field devices via the I/O modules 100. One or more of the power modules 232 may include an AC-to-DC (AC/DC) converter for converting Alternating Current (AC) (e.g., as supplied by AC mains, and so forth) to Direct Current (DC) for transmission to a field device, such as the motor 220

(e.g., in an implementation where the motor 220 comprises a DC motor). Two or more power modules 232 can be used to provide redundancy. For example, as shown in FIG. 2, two power modules 232 can be connected to each of the I/O modules 100 using a separate (redundant) power backplane 234 for each power module 232. In implementations, power backplane 234 may be connected to one or more of the I/O modules 100 using electromagnetic connectors 207/connector assemblies 208 (e.g., as previously described). In implementations, power backplane 234 may be included with circuit board 216, along with serial communications interface 204 and parallel communications interface 206.

The industrial control system 200 can receive electrical power from multiple sources. For example, AC power may be supplied from a power grid (e.g., using high voltage power from AC mains). AC power can also be supplied using local power generation (e.g., an on-site turbine or diesel local power generator). A power supply may distribute electrical power from the power grid to automation equipment of the industrial control system 200, such as controllers, I/O modules, and so forth. A power supply can also be used to distribute electrical power from the local power generator to the industrial control system equipment. The industrial control system 200 can also include additional (backup) power supplies configured to store and return DC power using multiple battery modules. For example, a power supply may function as a UPS. In some embodiments, multiple power supplies can be distributed (e.g., physically decentralized) within the industrial control system 200.

The industrial control system 200 may be implemented using a support frame 236. The support frame 236 may be used to support and/or interconnect the communications/control module(s) 214, the power module(s) 232, the switch fabric 202, the power backplane(s) 234, and/or the I/O modules 100. For example, the switch fabric 202 may be comprised of a circuit board 216. The circuit board 216 may be mounted to the support frame 236 using a fastener such as, for example, double sided tape, adhesive, or mechanical fasteners (e.g., screws, bolts, etc.). Additionally, the core members of the electromagnetic connectors 207 may be mounted to the support frame 236 using a fastener such as, for example, double sided tape, adhesive, or mechanical fasteners (e.g., screws, bolts, etc.). In some implementations, a template may be used to position the core members in the channel of the support frame 236. In implementations, the top surface of a core member may be substantially flush with a top surface of the circuit board 216. In other implementations, the top surface of a core member may be recessed some distance below a top surface of the circuit board 216 (e.g., by about one millimeter (1 mm)) and/or may extend above a top surface of the circuit board 216.

The support frame 236 may include slots 238 to provide registration for the I/O modules 100, such as for aligning connectors (e.g., electromagnetic connectors 207) of the I/O modules 100 with connectors (e.g., electromagnetic connectors 207) included with the circuit board 216 and/or connectors (e.g., electromagnetic connectors 207) of a power backplane 234. For example, an I/O module 100 may include connectors 240 having tabs/posts 242 for inserting into slots 238 and providing alignment of the I/O module 100 with respect to the circuit board 216. In implementations, one or more of the connectors 240 may be constructed from a thermally conductive material (e.g., metal) connected to a thermal plane of PCB 224 to conduct heat generated by components of the PCB 224 away from the PCB 224 and to the support frame 236, which itself may be constructed of a thermally conductive material (e.g., metal). Further, the industrial control system 200 may associate a unique physical ID with each physical slot 238 to uniquely identify each I/O module 100 coupled with a particular slot 238. For example, the ID of a particular slot 238 can be associated with an I/O module 100 coupled with the slot 238 and/or a second ID uniquely associated with the I/O module 100. Further, the ID of a particular I/O module 100 can be used as the ID for a slot 238 when the I/O module 100 is coupled with the slot 238. The support frame 236 can be constructed for cabinet mounting, rack mounting, wall mounting, and so forth.

It should be noted that while the industrial control system 200 is described in the accompanying figures as including one switch fabric 202, more than one switch fabric 202 may be provided with industrial control system 200. For example, two or more switch fabrics 202 may be used with the industrial control system 200 (e.g., to provide physical separation between redundant switch fabrics 202, and so forth). Each one of the switch fabrics 202 may be provided with its own support frame 236. Further, while both the serial communications interface 204 and the parallel communications interface 206 are described as included in a single switch fabric 202, it will be appreciated that physically separate switch fabrics may be provided, where one switch fabric includes the serial communications interface 204, and another switch fabric includes the parallel communications interface 206.

The control elements/subsystems and/or industrial elements (e.g., the I/O modules 100, the communications/control modules 214, the power modules 232, and so forth) can be connected together by one or more backplanes. For example, as described above, communications/control modules 214 can be connected to I/O modules 100 by a communications backplane (e.g., switch fabric 202). Further, power modules 232 can be connected to I/O modules 100 and/or to communications/control modules 214 by a power backplane 234. In some embodiments, physical interconnect devices (e.g., switches, connectors, or cables such as, but not limited to, those described in U.S. patent application Ser. No. 14/446,412, hereby incorporated by reference in its entirety) are used to connect to the I/O modules 100, the communications/control modules 214, the power modules 232, and possibly other industrial control system equipment. For example, a cable can be used to connect a communications/control module 214 to a network 230, another cable can be used to connect a power module 232 to a power grid, another cable can be used to connect a power module 232 to a local power generator, and so forth.

In some embodiments, the industrial control system 200 implements a secure control system, as described in U.S. patent application Ser. No. 14/469,931 and International Application No. PCT/US2013/053721, which are entirely incorporated herein by reference. For example, the industrial control system 200 includes a security credential source (e.g., a factory) and a security credential implementer (e.g., a key management entity). The security credential source is configured to generate a unique security credential (e.g., a key, a certificate, etc., such as a unique identifier, and/or a security credential). The security credential implementer is configured to provision the control elements/subsystems and/or industrial elements (e.g., cables, devices 217, I/O modules 100, communications/control modules 214, power modules 232, and so forth) with a unique security credential generated by the security credential source.

Multiple (e.g., every) device 217, I/O module 100, communications/control module 214, power module 232, physical interconnect devices, etc., of the industrial control system 200 can be provisioned with security credentials for providing security at multiple (e.g., all) levels of the industrial control system 200. Still further, the control elements/subsystems and/or industrial elements including the sensors and/or actuators and so forth, can be provisioned with the unique security credentials (e.g., keys, certificates, etc.) during manufacture (e.g., at birth), and can be managed from birth by a key management entity of the industrial control system 200 for promoting security of the industrial control system 200.

In some embodiments, communications between the control elements/subsystems and/or industrial elements including the sensors and/or actuators and so forth, of the industrial control system 200 includes an authentication process. The authentication process can be performed for authenticating control elements/subsystem and/or industrial elements including the sensors and/or actuators and so forth, implemented in the industrial control system 200. Further, the authentication process can utilize security credentials associated with the element and/or physical interconnect device for authenticating that element and/or physical interconnect device. For example, the security credentials can include encryption keys, certificates (e.g., public key certificates, digital certificates, identity certificates, security certificates, asymmetric certificates, standard certificates, non-standard certificates) and/or identification numbers.

In implementations, multiple control elements/subsystems and/or industrial elements of the industrial control system 200 are provisioned with their own unique security credentials. For example, each element of the industrial control system 200 may be provisioned with its own unique set(s) of certificates, encryption keys and/or identification numbers when the element is manufactured (e.g., the individual sets of keys and certificates are defined at the birth of the element). The sets of certificates, encryption keys and/or identification numbers are configured for providing/supporting strong encryption. The encryption keys can be implemented with standard (e.g., commercial off-the-shelf (COTS)) encryption algorithms, such as National Security Agency (NSA) algorithms, National Institute of Standards and Technology (NIST) algorithms, or the like.

Based upon the results of the authentication process, the element being authenticated can be activated, partial functionality of the element can be enabled or disabled within the industrial control system 200, complete functionality of the element can be enabled within the industrial control system 200, and/or functionality of the element within the industrial control system 200 can be completely disabled (e.g., no communication facilitated between that element and other elements of the industrial control system 200).

In embodiments, the keys, certificates and/or identification numbers associated with an element of the industrial control system 200 can specify the original equipment manufacturer (OEM) of that element. As used herein, the term "original equipment manufacturer" or "OEM" can be defined as an entity that physically manufactures the device (e.g., element) and/or a supplier of the device such as an entity that purchases the device from a physical manufacturer and sells the device. Thus, in embodiments, a device can be manufactured and distributed (sold) by an OEM that is both the physical manufacturer and the supplier of the device. However, in other embodiments, a device can be distributed by an OEM that is a supplier, but is not the physical manufacturer. In such embodiments, the OEM can cause the device to be manufactured by a physical manufacturer (e.g., the OEM can purchase, contract, order, etc. the device from the physical manufacturer).

Additionally, where the OEM comprises a supplier that is not the physical manufacturer of the device, the device can bear the brand of the supplier instead of brand of the physical manufacturer. For example, in embodiments where an element (e.g., a communications/control module 214 or an I/O module 100) is associated with a particular OEM that is a supplier but not the physical manufacturer, the element's keys, certificates and/or identification numbers can specify that origin. During authentication of an element of the industrial control system 200, when a determination is made that an element being authenticated was manufactured or supplied by an entity that is different than the OEM of one or more other elements of the industrial control system 200, then the functionality of that element can be at least partially disabled within the industrial control system 200. For example, limitations can be placed upon communication (e.g., data transfer) between that element and other elements of the industrial control system 200, such that the element cannot work/function within the industrial control system 200. When one of the elements of the industrial control system 200 requires replacement, this feature can prevent a user of the industrial control system 200 from unknowingly replacing the element with a non-homogenous element (e.g., an element having a different origin (a different OEM) than the remaining elements of the industrial control system 200) and implementing the element in the industrial control system 200. In this manner, the techniques described herein can prevent the substitution of elements of other OEM's into a secure industrial control system 200. In one example, the substitution of elements that furnish similar functionality in place of elements provided by an originating OEM can be prevented, since the substituted elements cannot authenticate and operate within the originating OEM's system. In another example, a first reseller can be provided with elements having a first set of physical and cryptographic labels by an originating OEM, and the first reseller's elements can be installed in an industrial control system 200. In this example, a second reseller can be provided with elements having a second (e.g., different) set of physical and cryptographic labels by the same originating OEM. In this example, the second reseller's elements may be prevented from operating within the industrial control system 200, since they may not authenticate and operate with the first reseller's elements. However, it should also be noted that the first reseller and the second reseller may enter into a mutual agreement, where the first and second elements can be configured to authenticate and operate within the same industrial control system 200. Further, in some embodiments, an agreement between resellers to allow interoperation can also be implemented so the agreement only applies to a specific customer, group of customers, facility, etc.

In another instance, a user can attempt to implement an incorrectly designated (e.g., mismarked) element within the industrial control system 200. For example, the mismarked element can have a physical indicia marked upon it which falsely indicates that the element is associated with the same OEM as the OEM of the other elements of the industrial control system 200. In such instances, the authentication process implemented by the industrial control system 200 can cause the user to be alerted that the element is counterfeit. This process can also promote improved security for the industrial control system 200, since counterfeit elements are often a vehicle by which malicious software can be introduced into the industrial control system 200. In embodiments, the authentication process provides a secure air gap for the industrial control system 200, ensuring that the secure industrial control system is physically isolated from insecure networks.

In implementations, the secure industrial control system 200 includes a key management entity. The key management entity can be configured for managing cryptographic keys (e.g., encryption keys) in a cryptosystem. This managing of cryptographic keys (e.g., key management) can include the generation, exchange, storage, use, and/or replacement of the keys. For example, the key management entity is configured to serve as a security credentials source, generating unique security credentials (e.g., public security credentials, secret security credentials) for the elements of the industrial control system 200. Key management pertains to keys at the user and/or system level (e.g., either between users or systems).

In embodiments, the key management entity comprises a secure entity such as an entity located in a secure facility. The key management entity can be remotely located from the I/O modules 100, the communications/control modules 214, and the network 230. For example, a firewall can separate the key management entity from the control elements or subsystems and the network 230 (e.g., a corporate network). In implementations, the firewall can be a software and/or hardware-based network security system that controls ingoing and outgoing network traffic by analyzing data packets and determining whether the data packets should be allowed through or not, based on a rule set. The firewall thus establishes a barrier between a trusted, secure internal network (e.g., the network 230) and another network that is not assumed to be secure and trusted (e.g., a cloud and/or the Internet). In embodiments, the firewall allows for selective (e.g., secure) communication between the key management entity and one or more of the control elements or subsystems and/or the network 230. In examples, one or more firewalls can be implemented at various locations within the industrial control system 200. For example, firewalls can be integrated into switches and/or workstations of the network 230.

The secure industrial control system 200 can further include one or more manufacturing entities (e.g., factories). The manufacturing entities can be associated with original equipment manufacturers (OEMs) for the elements of the industrial control system 200. The key management entity can be communicatively coupled with the manufacturing entity via a network (e.g., a cloud). In implementations, when the elements of the industrial control system 200 are being manufactured at one or more manufacturing entities, the key management entity can be communicatively coupled with (e.g., can have an encrypted communications pipeline to) the elements. The key management entity can utilize the communications pipeline for provisioning the elements with security credentials (e.g., inserting keys, certificates and/or identification numbers into the elements) at the point of manufacture.

Further, when the elements are placed into use (e.g., activated), the key management entity can be communicatively coupled (e.g., via an encrypted communications pipeline) to each individual element worldwide and can confirm and sign the use of specific code, revoke (e.g., remove) the use of any particular code, and/or enable the use of any particular code. Thus, the key management entity can communicate with each element at the factory where the element is originally manufactured (e.g., born), such that the element is born with managed keys. A master database and/or table including all encryption keys, certificates and/or identification numbers for each element of the industrial control system 200 can be maintained by the key management entity. The key management entity, through its communication with the elements, is configured for revoking keys, thereby promoting the ability of the authentication mechanism to counter theft and re-use of components.

In implementations, the key management entity can be communicatively coupled with one or more of the control elements/subsystems, industrial elements, and/or the network 230 via another network (e.g., a cloud and/or the Internet) and firewall. For example, in embodiments, the key management entity can be a centralized system or a distributed system. Moreover, in embodiments, the key management entity can be managed locally or remotely. In some implementations, the key management entity can be located within (e.g., integrated into) the network 230 and/or the control elements or subsystems. The key management entity can provide management and/or can be managed in a variety of ways. For example, the key management entity can be implemented/managed: by a customer at a central location, by the customer at individual factory locations, by an external third party management company and/or by the customer at different layers of the industrial control system 200, and at different locations, depending on the layer.

Varying levels of security (e.g., scalable, user-configured amounts of security) can be provided by the authentication process. For example, a base level of security can be provided which authenticates the elements and protects code within the elements. Other layers of security can be added as well. For example, security can be implemented to such a degree that a component, such as the communications/control module 214 or the I/O module 100, cannot power up without proper authentication occurring. In implementations, encryption in the code is implemented in the elements, while security credentials (e.g., keys and certificates) are implemented on the elements. Security can be distributed (e.g., flows) through the industrial control system 200. For example, security can flow through the industrial control system 200 all the way to an end user, who knows what a module is designed to control in that instance. In embodiments, the authentication process provides encryption, identification of devices for secure communication and authentication of system hardware or software components (e.g., via digital signature).

In implementations, the authentication process can be implemented to provide for and/or enable interoperability within the secure industrial control system 200 of elements manufactured and/or supplied by different manufacturers/vendors/suppliers (e.g., OEMs). For example, selective (e.g., some) interoperability between elements manufactured and/or supplied by different manufacturers/vendors/suppliers can be enabled. In embodiments, unique security credentials (e.g., keys) implemented during authentication can form a hierarchy, thereby allowing for different functions to be performed by different elements of the industrial control system 200.

The communication links connecting the components of the industrial control system 200 can further employ data packets, such as runt packets (e.g., packets smaller than sixty-four (64) bytes), placed (e.g., injected and/or stuffed) therein, providing an added level of security. The use of runt packets increases the level of difficulty with which outside information (e.g., malicious content such as false messages, malware (viruses), data mining applications, etc.) can be injected onto the communications links. For example, runt packets can be injected onto a communication link within gaps between data packets transmitted from the I/O module 100 to one or more field devices 217 via one or more of the communication channels 102 to hinder an external entity's ability to inject malicious content onto the communication link.

Figure 10:
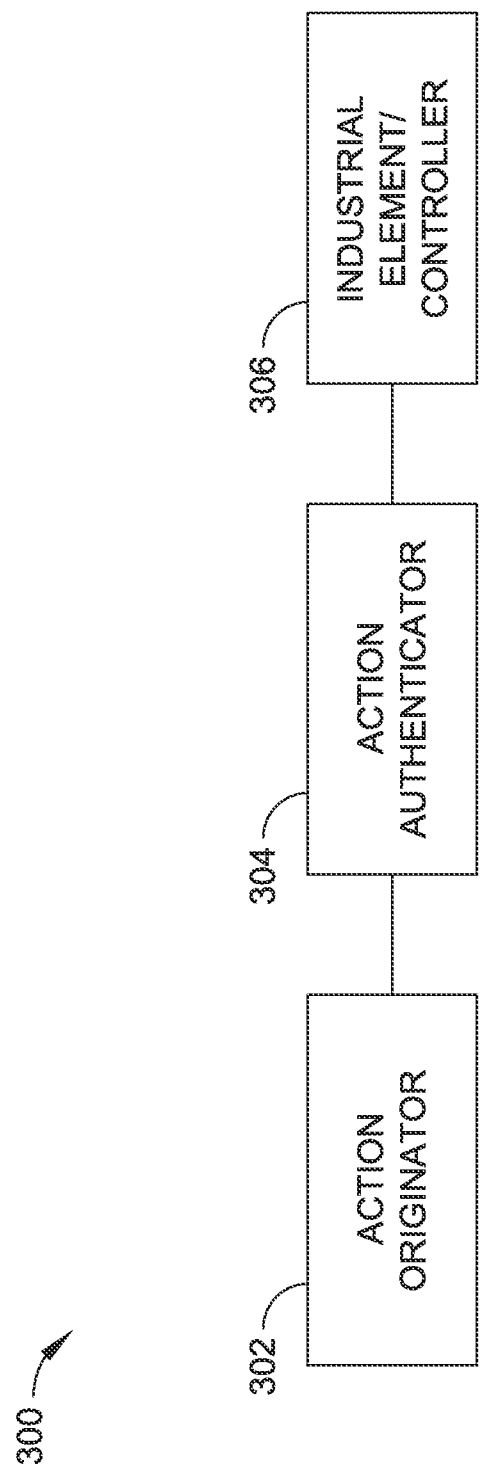
FIG. 10 is a block diagram illustrating an action authentication path for an industrial control system in accordance with embodiments of this disclosure.
Figure 11:
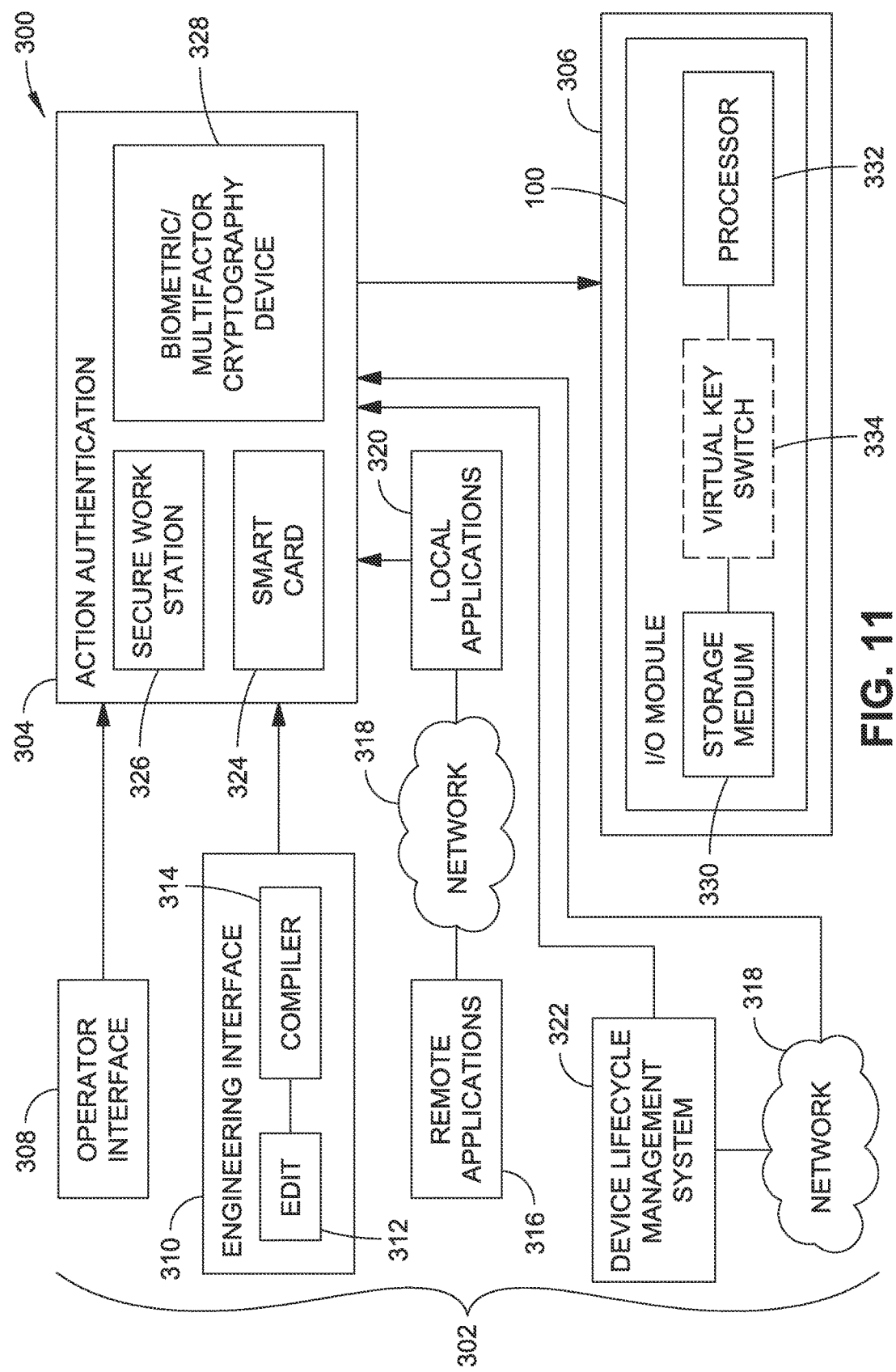
FIG. 11 is a block diagram further illustrating the action authentication path shown in FIG. 10 in accordance with embodiments of this disclosure.

As shown in FIGS. 10 and 11, the I/O module 100 or any other industrial element/controller 306 (e.g., communications/control module 214, field devices 217, physical interconnect devices, switches, power modules 232, etc.) can be at least partially operated according to requests/commands from an action originator 302. In implementations, the action originator 302 includes an operator interface 308 (e.g., SCADA or HMI), an engineering interface 310 including an editor 312 and a compiler 314, a local application 320, a remote application 316 (e.g., communicating through a network 318 via a local application 320), or the like. In the authentication path 300 illustrated in FIGS. 10 and 11, the industrial element/controller 306 (e.g., the I/O module 100) processes an action request (e.g., request for data, control command, firmware/software update, set point control, application image download, or the like) only when the action request has been signed and/or encrypted by an action authenticator 304. This prevents unauthorized action requests from valid user profiles and further secures the system from unauthorized action requests coming from invalid (e.g., hacked) profiles. In embodiments, an action authentication process is implemented as described in U.S. patent application Ser. No. 14/519,066, which is incorporated herein by reference in its entirety.

The action authenticator 304 can either be on-site with the action originator 302 (e.g., directly connected device lifecycle management system ("DLM") 322 or secured workstation 326) or remotely located (e.g., DLM 322 connected via the network 318). In general, the action authenticator 304 includes a storage medium with a private key stored thereon and a processor configured to sign and/or encrypt the action request generated by the action originator 302 with the private key. The private key is stored in a memory that cannot be accessed via standard operator login. For instance, the secured workstation 326 can require a physical key, portable encryption device (e.g., smart card, RFID tag, or the like), and/or biometric input for access.

In some embodiments, the action authenticator 304 includes a portable encryption device such as a smart card 324 (which can include a secured microprocessor). The advantage of using a portable encryption device is that the entire device (including the privately stored key and processor in communication therewith) can be carried with an operator or user that has authorized access to an interface of the action originator 302. Whether the action authentication node 304 accesses the authentication path 300 via secured or unsecured workstation, the action request from the action originator 302 can be securely signed and/or encrypted within the architecture of the portable encryption device instead of a potentially less secure workstation or cloud-based architecture. This secures the industrial control system 200 from unauthorized actions. For instance, an unauthorized person would have to physically take possession of the smart card 324 before being able to authenticate any action requests sent via the action originator 302.

Furthermore, multiple layers of security can be employed. For example, the action authenticator 304 can include a secured workstation 326 that is only accessible to sign and/or encrypt action requests via smart card access or the like. Additionally, the secured workstation 326 can be accessible via a biometric or multifactor cryptography device 328 (e.g., fingerprint scanner, iris scanner, and/or facial recognition device). In some embodiments, a multifactor cryptography device 328 requires a valid biometric input before enabling the smart card 324 or other portable encryption device to sign the action request.

The I/O module 100 or any other industrial element/controller 306 being driven by the action originator 302 is configured to receive the signed action request, verify the authenticity of the signed action request, and perform a requested action when the authenticity of the signed action request is verified. In some embodiments, the industrial element/controller 306 includes a storage medium 330 (e.g., SD/micro-SD card, HDD, SSD, or any other non-transitory storage device) configured to store the action request (e.g., application image, control command, and/or any other data sent by the action originator). The I/O module 100 or any other industrial element/controller 306 further includes a processor 332 (e.g., controller 106) that performs/executes the action request (i.e., performs the requested action) after the signature is verified. In some embodiments, the action request is encrypted by the action originator 302 and/or the action authenticator 332 and must also be decrypted by the processor 332 before the requested action can be performed. In implementations, the I/O module 100 or any other industrial element/controller 306 includes a virtual key switch 334 (e.g., a software module running on the processor 332) that enables the processor 332 to perform the requested action only after the action request signature is verified and/or after the action request is decrypted. In some embodiments, each and every action or each one of a selection of critical actions must clear the authentication path before being run on the I/O module 100 or any other industrial element/controller 306.

Figure 12:
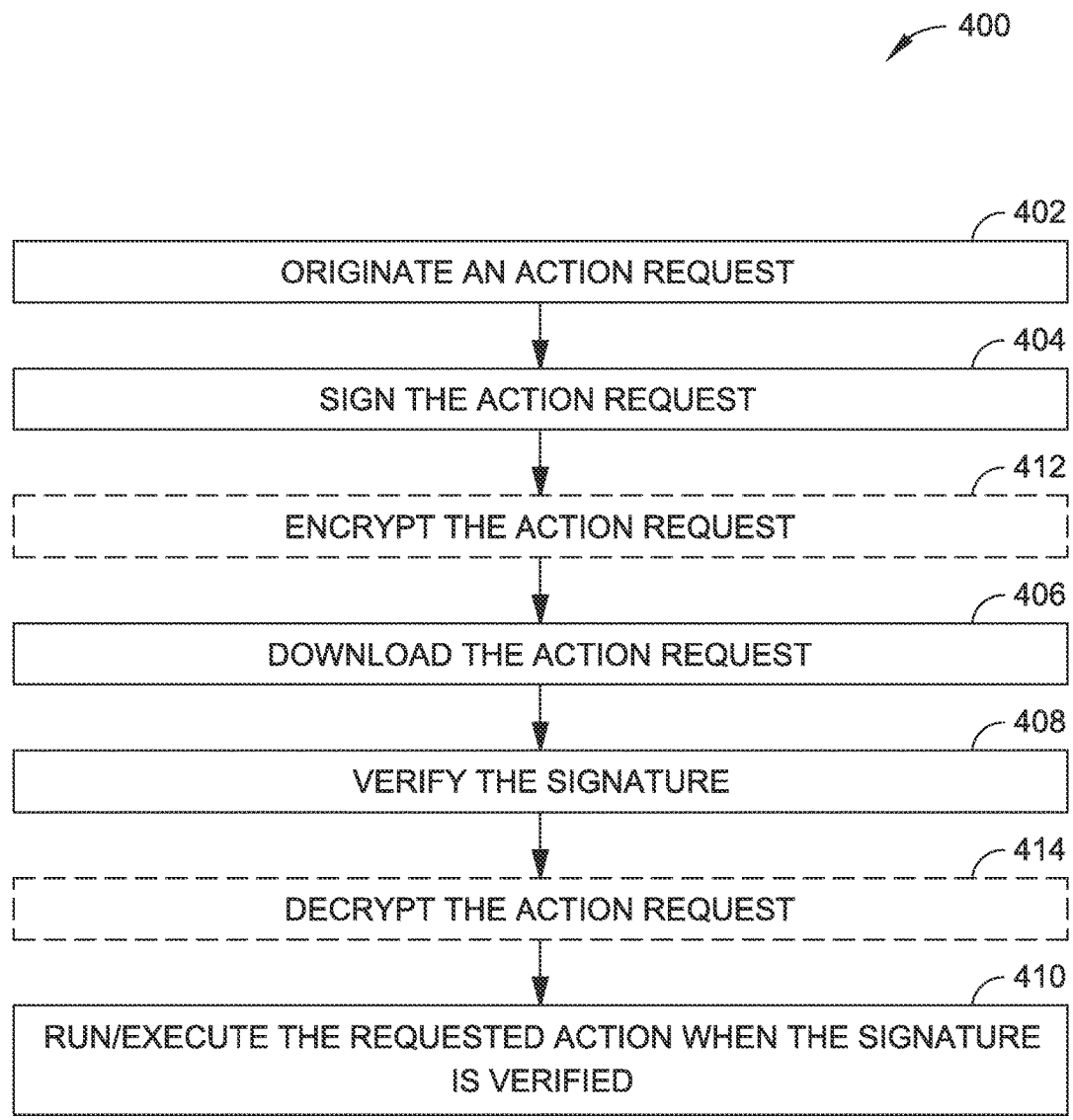
FIG. 12 is a flow diagram illustrating an example of a process for authenticating an action request via an action authentication path, such as the action authentication path shown in FIG. 10 or FIG. 11.

FIG. 12 shows a flow diagram of an example process 400 of authenticating an action request via an action authentication path, such as action authentication path 300 described herein. In implementations, the method 400 can be manifested by the industrial control system 200 and/or authentication path 300 of the industrial control system 200. The method 400 includes: (402) originating an action request (e.g., via an operator/engineering interface 308/310 or a remote/local application interface 316/320); (404) signing the action request with the action authenticator 304; (412) optionally encrypting the action request with the action authenticator 304; (406) sending or downloading the signed action request to an I/O module 100 or any other industrial element/controller 306; (408) verifying the authenticity of the signed action request; (414) optionally decrypting the action request with the I/O module 100 or any other industrial element/controller 306; and (410) performing a requested action with the I/O module 100 or any other industrial element/controller 306 when the authenticity of the signed action request is verified.

For enhanced security, the I/O module 100 or any other industrial element/controller 306 can be further configured to perform an authentication sequence with the action authenticator 304 (e.g., with a smart card 324 or the like) before the requested action is run by the I/O module 100 or any other industrial element/controller 306. For example, the so-called "handshake" can be performed prior to step 410 or even prior to step 406. In some embodiments, the signature and verification steps 404 and 408 can be completely replaced with a more intricate authentication sequence. Alternatively, the authentication sequence can be performed as an additional security measure to augment the simpler signature verification and/or decryption measures.

In some embodiments, the authentication sequence implemented by the I/O module 100 or any other industrial element/controller 306 can include: sending a request datagram to the action authenticator 304, the request datagram including a first nonce, a first device authentication key certificate (e.g., a first authentication certificate that contains a device authentication key), and a first identity attribute certificate; receiving a response datagram from the action authenticator 304, the response datagram including a second nonce, a first signature associated with the first and second nonces, a second device authentication key certificate (e.g., a second authentication certificate that contains a device authentication key), and a second identity attribute certificate; validating the response datagram by verifying the first signature associated with the first and second nonces, the second device authentication key certificate, and the second identity attribute certificate; and sending an authentication datagram to the action authenticator 304 when the response datagram is valid, the authentication datagram including a second signature associated with the first and second nonces.

Alternatively, the action authenticator 304 can initiate the handshake, in which case the authentication sequence implemented by the I/O module 100 or any other industrial element/controller 306 can include: receiving a request datagram from the action authenticator 304, the request datagram including a first nonce, a first device authentication key certificate, and a first identity attribute certificate; validating the request datagram by verifying the first device authentication key certificate and the first identity attribute certificate; sending a response datagram to the action authenticator 304 when the request datagram is valid, the response datagram including a second nonce, a first signature associated with the first and second nonces, a second device authentication key certificate, and a second identity attribute certificate; receiving an authentication datagram from the action authenticator 304, the authentication datagram including a second signature associated with the first and second nonces; and validating the authentication datagram by verifying the second signature associated with the first and second nonces.

The handshake or authentication sequence that can be implemented by the I/O module 100 or any other industrial element/controller 306 and the action authenticator 304 is further described in U.S. patent application Ser. No. 14/519,047, which is fully incorporated herein by reference. Those skilled in the art will appreciate the applicability of the handshake between redundant communications/control modules 106 to the handshake described herein between the I/O module 100 or any other industrial element/controller 306 and the action authenticator 304.

Each of the action originator 302, the action authenticator 304, and the I/O module 100 or any other industrial element/controller 306 can include circuitry and/or logic enabled to perform the functions or operations (e.g., blocks of method 400 and the authentication sequence) described herein. For example, each of the action originator 302, the action authenticator 304, and the I/O module 100 or any other industrial element/controller 306 can include one or more processors that execute program instruction stored permanently, semi-permanently, or temporarily by a non-transitory machine readable medium such as, but not limited to: a hard disk drive (HDD), solid-state disk (SDD), optical disk, magnetic storage device, flash drive, or SD/micro-SD card.

As discussed above, two or more I/O modules 100 may be connected in parallel with one another, and may be capable of communicating with one another. In some embodiments, for further security, the I/O modules 100 are configured to perform an authentication sequence or handshake to authenticate one another at predefined events or times including such as startup, reset, installation of a new I/O module 100, replacement of an I/O module 100, periodically, at scheduled times, and so forth. By causing the I/O modules 100 to authenticate one another, counterfeit or maliciously introduced I/O modules 100 can be avoided.

Figure 13:
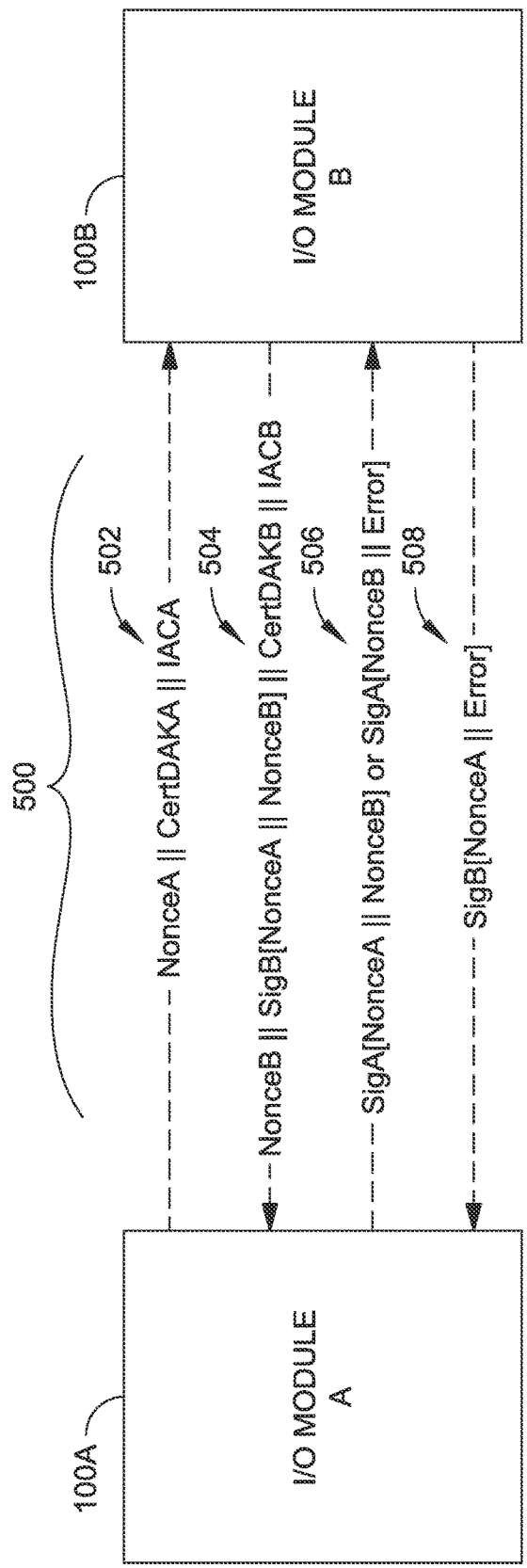
FIG. 13 is a block diagram illustrating a first input/output module performing an authentication sequence with a second input/output module in accordance with embodiments of this disclosure.

FIG. 13 shows exemplary datagrams 500 transmitted between two I/O modules 100 (e.g., a first I/O module 100A and a second I/O module 100B) in performance of the authentication sequence. To initiate the authentication sequence, the first I/O module 100A is configured to transmit a request datagram 502 to the second I/O module 100B. In implementations, the request datagram 502 includes a first plain text nonce (NonceA), a first device authentication key certificate (CertDAKA) containing a first device authentication key (DAKA), and a first identity attribute certificate (IACA). In some embodiments, the first I/O module 100A is configured to generate the first nonce (NonceA) with a true random number generator (hereinafter "TRNG") and concatenate or otherwise combine the first nonce (NonceA), the first device authentication key certificate (CertDAKA), and the first identity attribute certificate (IACA) to generate the request datagram 502. In some embodiments, the first device authentication key certificate (CertDAKA) and the first identity attribute certificate (IACA) are locally stored by the first I/O module 100A. For example, the certificates may be stored in a local memory (e.g., ROM, RAM, flash memory, or other non-transitory storage medium) of the first I/O module 100A.

The second I/O module 100B is configured to validate the request datagram by verifying the first device authentication key certificate (CertDAKA) and the first identity attribute certificate (IACA) with public keys that are generated by a device lifecycle management system (DLM) or derived utilizing crypto library functions. In this regard, the public keys may be stored in SRAM or another local memory of the I/O module 100 and used with crypto library functions to verify or cryptographically sign exchanged data, such as the nonces exchanged between the I/O modules 100. In some embodiments, the second I/O module 100B may verify the certificates with an elliptic curve digital signing algorithm (hereinafter "ECDSA") or other verification operation. In some embodiments, the second I/O module 100B may be further configured to validate the certificate values from plain text values by verifying the following: certificate type is device authentication key (hereinafter "DAK") or identity attribute certificate (hereinafter "IAC") for each certificate; IAC names match, DAK certificate module type matches module type argument; and/or microprocessor serial number (hereinafter "MPSN") of each certificate in the message payload match each other. In some embodiments, the second I/O module 100B may be further configured to verify the DAK and IAC certificates are not in a local revocation list (e.g., a list or database including revoked and/or invalid certificates). When the second I/O module 100B fails to validate the request datagram, the second I/O module 100B may generate an error message, partially or completely disable the first I/O module 100A, and/or discontinue or restrict communications to/from the first I/O module 100A.

Responsive to a valid request datagram 502, the second I/O module 100B is configured to transmit a response datagram 504 to the first I/O module 100A. In implementations, the response datagram 504 includes a second plain text nonce (NonceB), a first signature associated with the first and second nonces (SigB[NonceA||NonceB]), a second device authentication key certificate (certDAKB) containing a second device authentication key (DAKB), and a second identity attribute certificate (IACB). In some embodiments, the second I/O module 100B is configured to generate the second nonce (NonceB) with a TRNG, concatenate or otherwise combine the first nonce (NonceA) and the second nonce (NonceB), and sign the concatenated/combined nonces with a private key (e.g., DAK) that is locally stored by the second I/O module 100B. The second I/O module 100B is further configured to concatenate or otherwise combine the second nonce (NonceB), the first signature associated with the first and second nonces (SigB[NonceA∥NonceB]), the second device authentication key certificate (certDAKB), and the second identity attribute certificate (IACB) to generate the response datagram 504. In some embodiments, the second device authentication key certificate (CertDAKB) and the second identity attribute certificate (IACB) are locally stored by the second I/O module 100B. For example, the certificates may be stored in a local memory (e.g., ROM, RAM, flash memory, or other non-transitory storage medium) of the second I/O module 100B.

The first I/O module 100A is configured to validate the response datagram by verifying the second device authentication key certificate (CertDAKB) and the second identity attribute certificate (IACB) with public keys that are locally stored or retrieved from a crypto library utilizing ECDSA or another verification operation. In some embodiments, the first I/O module 100A may be further configured to validate the certificate values from plain text values by verifying the following: IAC & DAK certificates have matching MPSNs, IAC names match, certificate types are correct on both certificates (IAC & DAK), the correct issuer name is on both certificates, DAK module type is the correct type (e.g., check to see if module type=communications/control module). In some embodiments, the first I/O module 100A may be further configured to verify the DAK and IAC certificates are not in a local revocation list.

To validate the response datagram, the first I/O module 100A may be further configured to verify the first signature associated with the first and second nonces (sigB[NonceA∥NonceB]). In some embodiments, the first I/O module 100A is configured to verify the first signature (sigB[NonceA∥NonceB]) by concatenating the first locally stored nonce (NonceA) and the second plaintext nonce (NonceB) received from the second I/O module 100B, verifying the first cryptographic signature (sigB[NonceA∥NonceB]) with a public device authentication key (e.g., using DAKB from certDAKB), and comparing the locally generated concatenation of the first nonce and the second nonce with the cryptographically verified concatenation of the first nonce and the second nonce. When the first I/O module 100A fails to validate the response datagram, the first I/O module 100A may generate an error message, partially or completely disable the second I/O module 100B, and/or discontinue or restrict communications to/from the second I/O module 100B.

The first I/O module 100A is further configured to transmit an authentication datagram 506 to the second I/O module 100B when the response datagram 504 is valid. In implementations, the authentication datagram 506 includes a second signature associated with the first and second nonces (sigA[NonceA∥NonceB]). In some embodiments, the first I/O module 100A is configured to sign the locally generated concatenation of the first and second nonces a private key (e.g., DAK) that is locally stored by the first I/O module 100A. When the response datagram is invalid, the authentication datagram 506 may be replaced with a "failed" authentication datagram 506 including a signature associated with the second nonce and an error reporting (e.g., "failure") message (sigA[NonceB∥Error]) generated by the first I/O module 100A.

Responsive to the authentication datagram 506, the second I/O module 100B may be further configured to transmit a responsive authentication datagram 508 to the first I/O module 100A. In implementations, the responsive authentication datagram 508 includes a signature associated with the first nonce and an error reporting (e.g., "success" or "failure") message (sigB[NonceA∥Error]) generated by the second I/O module 100B. In some embodiments, the second I/O module 100B is configured to validate the authentication datagram 506 by verifying the second signature associated with the first and second nonces (sigA[NonceA∥NonceB]). In some embodiments, the second I/O module 100B is configured to verify the second signature (sigA[NonceA∥NonceB]) by concatenating the first plaintext nonce (NonceA) received from the first I/O module 100A and the second locally stored nonce (NonceB), verifying the second cryptographic signature (sigA[NonceA∥NonceB]) with a public device authentication key (e.g., using DAKA from certDAKA), and comparing the locally generated concatenation of the first nonce and the second nonce with the cryptographically verified concatenation of the first nonce and the second nonce. In addition to the error reporting message, when the second I/O module 100B fails to validate the authentication datagram, the second I/O module 100B may partially or completely disable the first I/O module 100A, and/or discontinue or restrict communications to/from the first I/O module 100A.

In implementations where the I/O modules 100 are arranged according to a "master-slave" configuration, the master (e.g., the first I/O module 100A) may be configured to authenticate each slave. In the event of a failed authentication, the master may at least partially disable or restrict communications to/from the unauthenticated slave. Alternatively, two or more slave I/O modules 100 and/or two or more I/O modules 100 operating in parallel without a master may authenticate one another. A failed authentication may result in both devices or a pseudo-secondary device (e.g., non-initiating I/O module) being partially or completely disabled. For example, two or more redundant I/O modules 100 can be disabled should they fail to successfully complete the authentication sequence at startup or another predefined time/event.

Each I/O module 100 may include circuitry and/or logic enabled to perform the functions described herein. For example, the controller 106 may be configured to execute program instructions stored permanently, semi-permanently, or temporarily by a non-transitory machine readable medium 108 such as a hard disk drive (HDD), solid-state disk (SDD), optical disk, magnetic storage device, flash drive, or the like. Accordingly, the controller 106 may be configured to carry out an authentication initiator sequence 600 and/or an authentication responder sequence 700 illustrated in FIGS. 14 and 15, respectively.

Figure 14:
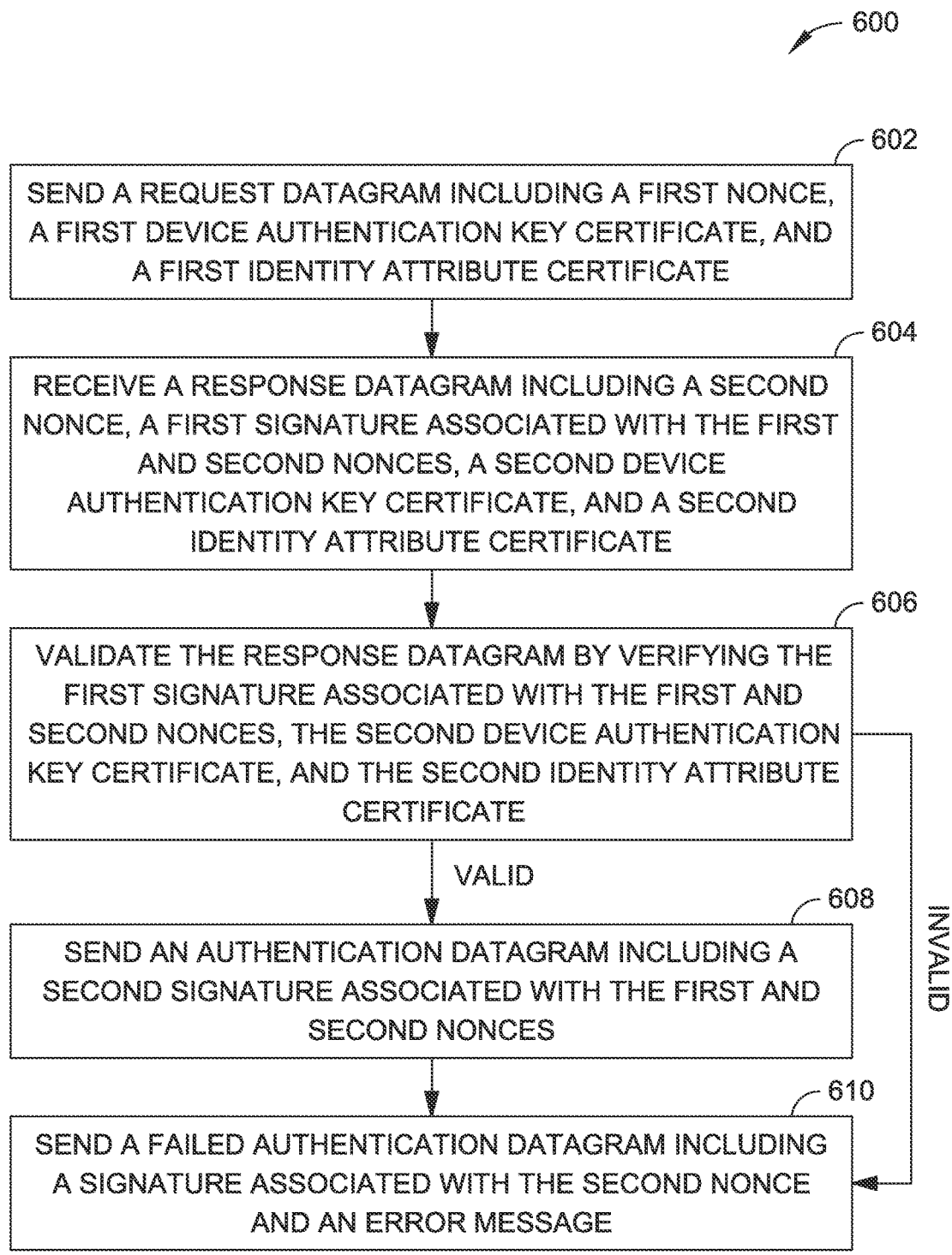
FIG. 14 is a flow diagram illustrating an example of an authentication sequence performed by a first input/output module authenticating with a second input/output module.

Referring to FIG. 14, the authentication initiator sequence 600 implemented by the first I/O module 100A (i.e., the initiator) may include: (602) sending a request datagram to a second I/O module 100B (i.e. the responder), the request datagram including a first nonce, a first device authentication key certificate, and a first identity attribute certificate; (604) receiving a response datagram from the second I/O module 100B, the response datagram including a second nonce, a first signature associated with the first and second nonces, a second device authentication key certificate, and a second identity attribute certificate; (606) validating the response datagram by verifying the first signature associated with the first and second nonces, the second device authentication key certificate, and the second identity attribute certificate; and (610) sending an authentication datagram to the second I/O module 100B when the response datagram is valid, the authentication datagram including a second signature associated with the first and second nonces; or (608) sending a failed authentication datagram to the second I/O module 100B when the response datagram is invalid, the failed authentication datagram including a signature associated with the second nonce and an error message.

Figure 15:
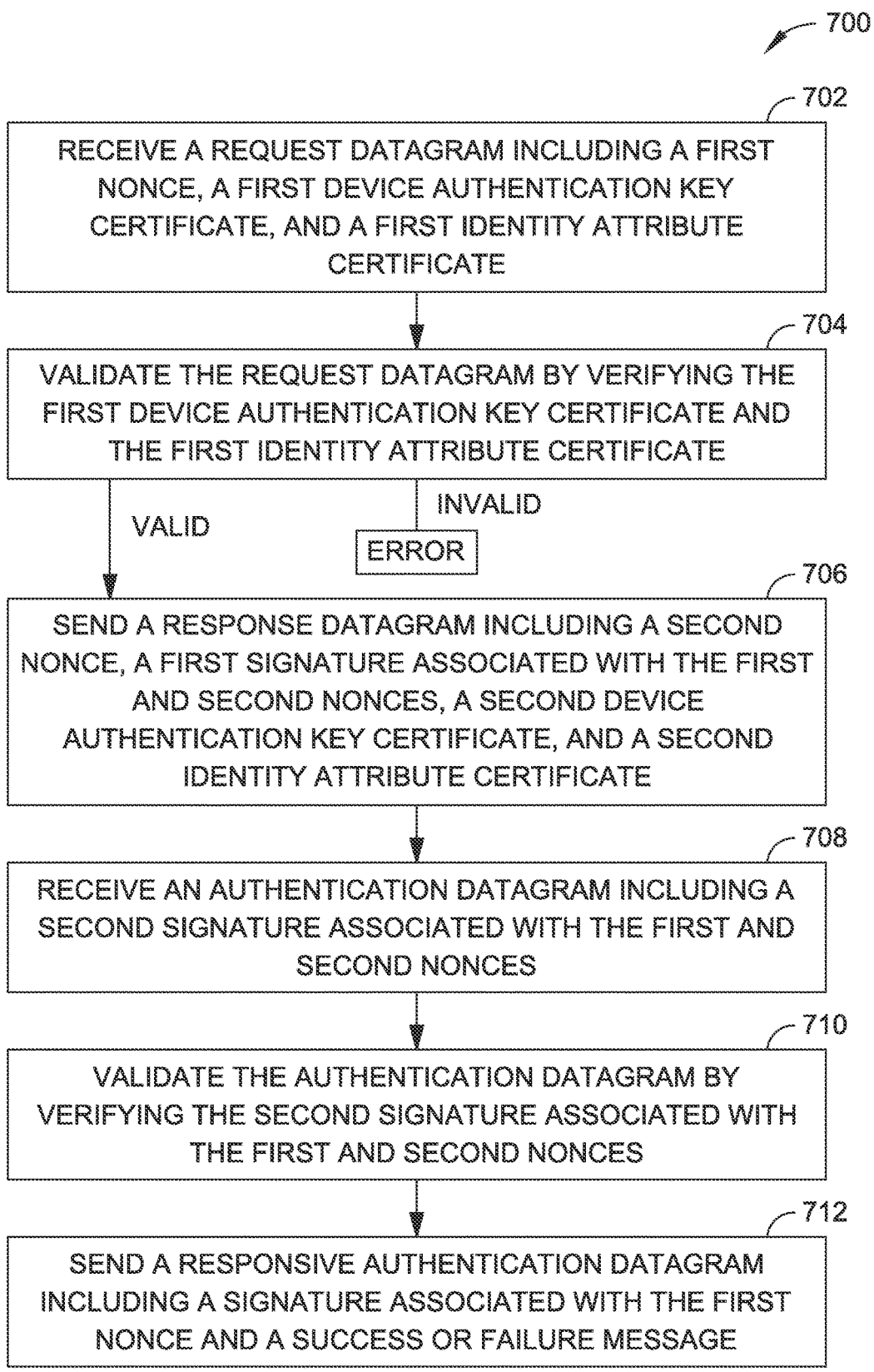
FIG. 15 is a flow diagram illustrating an example of a responsive authentication sequence performed by a second input/output module in response to an authentication sequence (e.g., as illustrated in FIG. 14) performed by a first input/output module.

Referring to FIG. 15, the authentication responder sequence 700 (e.g., implemented by the second I/O module 100B) may include: (702) receiving a request datagram from the first I/O module 100A, the request datagram including a first nonce, a first device authentication key certificate, and a first identity attribute certificate; (704) validating the request datagram by verifying the first device authentication key certificate and the first identity attribute certificate; (706) sending a response datagram to the first I/O module 100A when the request datagram is valid, the response datagram including a second nonce, a first signature associated with the first and second nonces, a second device authentication key certificate, and a second identity attribute certificate; (708) receiving an authentication datagram from the first I/O module 100A, the authentication datagram including a second signature associated with the first and second nonces; (710) validating the authentication datagram by verifying the second signature associated with the first and second nonces; and (712) sending a responsive authentication datagram to the first I/O module 100A, the responsive authentication datagram including a signature associated with the first nonce and a success or failure message.

In some embodiments, the I/O modules 100 can be further configured to authenticate with and/or be authenticated by other elements of the industrial control system 200, such as communications/control modules 214, field devices 217 (e.g. sensors 218 or actuators 220), power modules 232, physical interconnect devices, switches, and the like. Industrial controllers/elements can be configured to authenticate one another or other devices by performing a sequence or handshake such as the authentication sequence (between redundant I/O modules 100) described above. For example, the I/O module 100 can be configured to perform an authentication sequence (e.g., as described above) with a communications/control module 214 or a field device 217. It is further contemplated that, communicatively coupled field devices 217 (e.g., sensors 218 or actuators 220) can also be configured to authenticate with each other in a manner similar to the authentication process described above.

It should be understood that any of the functions described herein can be implemented using hardware (e.g., fixed logic circuitry such as integrated circuits), software, firmware, manual processing, or a combination thereof. Thus, the blocks, operations, functions, or steps discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A control system comprising:
a control module having a first encasement configured to mate with a support frame;
an input/output module having a second encasement configured to mate with the support frame, the input/output module communicatively coupled with the control module, the input/output module including a plurality of communication channels within the second encasement, each channel of the plurality of communication channels configured to connect to one or more field devices, the input/output module further including switch fabric within the second encasement, the switch fabric configured to selectively facilitate connectivity between the control module and the one or more field devices via the plurality of communication channels;
a serial communications interface configured for connecting the input/output module to the control module, the serial communications interface connecting the input/output module in parallel with a second input/output module, the serial communications interface configured for transmitting information between the input/output module and the control module; and
a parallel communications interface configured for separately connecting the input/output module to the control module, the parallel communications interface configured for transmitting information between the input/output module and the control module, and transmitting information between the input/output module and the second input/output module.

2. The control system of claim 1, wherein the serial communications interface comprises a multidrop bus.

3. The control system of claim 1, wherein the parallel communications interface comprises a cross switch.

4. The control system of claim 1, wherein the control module is configured to assign the input/output module a unique identifier associated with a physical location where the input/output module is physically connected to the control module.

5. The control system of claim 1, wherein the serial communications interface is configured for connecting the input/output module to a redundant control module in parallel, and the parallel communications interface is configured for separately connecting the input/output module to the redundant control module.

6. The control system of claim 1, further comprising a power module for supplying electrical power to the input/output module.

7. The control system of claim 1, wherein the input/output module is configured to supply electrical power to at least one field device via a respective channel of the plurality of communication channels.

8. The control system of claim 1, wherein the plurality of communication channels comprise a plurality of Ethernet channels.

9. The control system of claim 1, wherein the input/output module further includes a controller coupled to the switch fabric, the controller configured to accommodate multiple communication standards running concurrently on respective channels of the plurality of communication channels including at least two of: an Ethernet bus, an H1 field bus, a Process Field Bus (PROFIBUS), a Highway Addressable Remote Transducer (HART) bus, a Modbus, and an Object Linking and Embedding for Process Control Unified Architecture (OPC UA) bus.

10. The control system of claim 1, wherein the input/output module is operable as at least one of an Object Linking and Embedding for Process Control Unified Architecture (OPC UA) client or an OPC UA server.

11. The control system of claim 1, wherein the input/output module is configured to synchronize the one or more field devices according to an IEEE 1588 timing protocol.

12. The control system of claim 1, further comprising a device lifetime management system in communication with the input/output module, wherein the device lifetime management system is configured to authenticate the one or more field devices.

13. An input/output module comprising:
an encasement configured to mate with a support frame;
a plurality of communication channels within the encasement, each channel of the plurality of communication channels configured to connect to one or more field devices;
switch fabric within the encasement, the switch fabric configured to selectively facilitate connectivity between an external control module and the one or more field devices via the plurality of communication channels;
a serial communications port configured for connecting the input/output module to the control module in parallel with a second input/output module, the serial communications port configured for transmitting information between the input/output module and the control module; and
a parallel communications port configured for separately connecting the input/output module to the control module, the parallel communications port configured for transmitting information between the input/output module and the control module, and transmitting information between the input/output module and the second input/output module.

14. The input/output module of claim 13, wherein the plurality of communication channels comprise a plurality of Ethernet channels.

15. The input/output module of claim 14, wherein the input/output module is configured to supply electrical power to at least one field device via a respective Ethernet channel of the plurality of Ethernet channels.

16. The input/output module of claim 13, further comprising a controller coupled to the switch fabric, the controller configured to accommodate multiple communication standards running concurrently on respective channels of the plurality of communication channels including at least two of: an Ethernet bus, an H1 field bus, a Process Field Bus (PROFIBUS), a Highway Addressable Remote Transducer (HART) bus, a Modbus, and an Object Linking and Embedding for Process Control Unified Architecture (OPC UA) bus.

17. The input/output module of claim 13, wherein the controller is configured to run at least one of an Object Linking and Embedding for Process Control Unified Architecture (OPC UA) client communications/control protocol or an OPC UA server communications/control protocol.

18. The input/output module of claim 13, wherein at least one of the serial communications port or the parallel communications port comprises an electromagnetic connector forming a first magnetic circuit portion, including:
a first core member; and
a first coil disposed of the first core member, the electromagnetic connector configured to mate with a second electromagnetic connector, the second electromagnetic connector configured to form a second magnetic circuit portion and comprising a second core member and a second coil disposed of the second core member, the first core member and the second core member configured to couple the first coil to the second coil with a magnetic circuit formed from the first magnetic circuit portion and the second magnetic circuit portion when the electromagnetic connector is mated with the second electromagnetic connector, the magnetic circuit configured to induce a signal in the first coil when the second coil is energized.

19. The input/output module of claim 18, wherein the first coil comprises a planar winding disposed of a printed circuit board.

20. The input/output module of claim 18, wherein the first core member comprises an E-shaped core member.

21. The input/output module of claim 18, wherein the magnetic circuit formed from the first core member and the second core member comprises an air gap.

* * * * *